US012794059B2

(12) United States Patent
Kemp et al.

(10) Patent No.: US 12,794,059 B2
(45) Date of Patent: Nov. 10, 2026

(54) BATTERY BOX ASSEMBLY

(71) Applicant: Textron Inc., Providence, RI (US)

(72) Inventors: Ricky Veldee Kemp, Augusta, GA (US); Trevor Douglas Roebuck, Evans, GA (US); Donny Hammond, Augusta, GA (US); Charles Dauchess, North Augusta, SC (US)

(73) Assignee: Textron Inc., Providence, RI (US)

( * ) Notice: Subject to any disclaimer, the term of this patent is extended or adjusted under 35 U.S.C. 154(b) by 272 days.

(21) Appl. No.: 18/606,145

(22) Filed: Mar. 15, 2024

(65) Prior Publication Data

US 2024/0313315 A1 Sep. 19, 2024

Related U.S. Application Data

(60) Provisional application No. 63/452,784, filed on Mar. 17, 2023.

(51) Int. Cl.
*H01M 50/249* (2021.01)
*B60K 1/04* (2019.01)
(Continued)

(52) U.S. Cl.
CPC ............. *H01M 50/224* (2021.01); *B60K 1/04* (2013.01); *H01M 10/615* (2015.04); (Continued)

(58) Field of Classification Search
CPC ............. H01M 50/224; H01M 10/615; H01M 10/625; H01M 50/172; H01M 50/231; H01M 50/24; H01M 50/244; H01M 50/249; H01M 50/271; H01M 50/289; H01M 2200/20; H01M 2220/20; H01M 50/209; H01M 10/658; B60K 1/04; (Continued)

(56) References Cited

U.S. PATENT DOCUMENTS

| | | | |
|---|---|---|---|
| 5,647,534 | A | 7/1997 | Kelz et al. |
| 7,400,111 | B2 | 7/2008 | Kishibata et al. |

(Continued)

FOREIGN PATENT DOCUMENTS

| | | |
|---|---|---|
| CN | 201457641 | 5/2010 |
| CN | 107946498 | 4/2018 |

(Continued)

OTHER PUBLICATIONS

Shelly, Tyler, et al. "Evaluation of Heat Pumping and Waste Heat Recovery for Battery Electric Vehicle Thermal Management." (2021) https://docs.lib.purdue.edu/cgi/viewcontent.cgi?article=3218&context=iracc.

(Continued)

*Primary Examiner* — Justin Holmes
(74) *Attorney, Agent, or Firm* — BainwoodHuang

(57) ABSTRACT

An improved technique is directed to a battery box assembly. The technique includes a metallic skeleton. The technique further includes an insulative inner layer coupled with the metallic skeleton. The insulative inner layer faces an inner space defined by the metallic skeleton. The technique further includes an insulative outer layer coupled with the metallic skeleton. The insulative outer layer facing outwardly from the metallic skeleton.

19 Claims, 32 Drawing Sheets

(51) Int. Cl.

| | |
|---|---|
| ***H01M 10/615*** | (2014.01) |
| ***H01M 10/625*** | (2014.01) |
| ***H01M 50/172*** | (2021.01) |
| ***H01M 50/224*** | (2021.01) |
| ***H01M 50/231*** | (2021.01) |
| ***H01M 50/24*** | (2021.01) |
| ***H01M 50/244*** | (2021.01) |
| ***H01M 50/271*** | (2021.01) |
| ***H01M 50/289*** | (2021.01) |

(52) U.S. Cl.

CPC ....... *H01M 10/625* (2015.04); *H01M 50/172* (2021.01); *H01M 50/231* (2021.01); *H01M 50/24* (2021.01); *H01M 50/244* (2021.01); *H01M 50/249* (2021.01); *H01M 50/271* (2021.01); *H01M 50/289* (2021.01); *B60K 2001/0416* (2013.01); *H01M 2200/20* (2013.01); *H01M 2220/20* (2013.01)

(58) Field of Classification Search

CPC ...... B60K 2001/0416; B60K 2001/005; B60K 2001/0438; Y02E 60/10

See application file for complete search history.

(56) References Cited

U.S. PATENT DOCUMENTS

| | | | | |
|---|---|---|---|---|
| 8,851,153 | B2 | 10/2014 | Park et al. | |
| 8,919,481 | B2 | 12/2014 | Matsuda | |
| 9,096,133 | B2 | 8/2015 | Kohler et al. | |
| 9,643,514 | B2 | 5/2017 | Matsuda | |
| 9,660,236 | B2 * | 5/2017 | Kondo | B62M 6/90 |
| 9,975,425 | B2 | 5/2018 | Monfette et al. | |
| 10,011,324 | B2 | 7/2018 | Inoue | |
| 10,603,997 | B2 | 3/2020 | Bergstrom et al. | |
| 10,981,470 | B2 | 4/2021 | Milton et al. | |
| 10,992,007 | B2 | 4/2021 | Kohda | |
| 11,059,351 | B2 | 7/2021 | Zenner et al. | |
| 2018/0272877 | A1 | 9/2018 | Sakowski et al. | |
| 2020/0076029 | A1 | 3/2020 | Litz | |
| 2022/0097511 | A1 | 3/2022 | Wang et al. | |
| 2022/0161630 | A1 | 5/2022 | Lindquist et al. | |
| 2022/0219782 | A1 | 7/2022 | Bruneau et al. | |
| 2022/0219784 | A1 | 7/2022 | Bruneau et al. | |
| 2022/0250715 | A1 | 8/2022 | Leblanc | |
| 2022/0306222 | A1 * | 9/2022 | Deckard | B60Q 1/543 |
| 2024/0145849 | A1 | 5/2024 | Ke et al. | |
| 2024/0149654 | A1 | 5/2024 | Kvaldén et al. | |
| 2024/0162548 | A1 | 5/2024 | Erlacher et al. | |
| 2024/0270059 | A1 | 8/2024 | Ashkar | |
| 2024/0274975 | A1 | 8/2024 | Xu et al. | |

FOREIGN PATENT DOCUMENTS

| | | | | |
|---|---|---|---|---|
| CN | 210073941 | U | * | 2/2020 |
| CN | 111993883 | A | | 11/2020 |
| CN | 212685467 | U | | 3/2021 |
| CN | 216101966 | U | | 3/2022 |
| CN | 115214334 | A | | 10/2022 |
| CN | 217903274 | U | * | 11/2022 |
| CN | 218456114 | U | * | 2/2023 |
| DE | 202018105262 | U1 | | 9/2018 |

OTHER PUBLICATIONS

Yang, Dazhang, et al. “Recent advances on air heating system of cabin for pure electric vehicles: A review.” Heliyon (2022): e11032 https://www.sciencedirect.com/science/article/pii/S2405844022023209/pdfft?md5=ad2f8fdb525f4d3e1e0b42c931916d5f&pid=1-s2.0-S2405844022023209-main.pdf.

Ahn, Jae Hwan, et al. “Heating performance characteristics of a dual source heat pump using air and waste heat in electric vehicles.” Applied Energy 119 (2014): 1-9. https://www.sciencedirect.com/science/article/pii/S0306261914000051.

Tian, Zhen, et al. “Performance evaluation of an electric vehicle thermal management system with waste heat recovery.” Applied Thermal Engineering 169 (2020): 114976. https://www.sciencedirect.com/science/article/pii/S1359431119357242.

Ayartürk, Hasan, et al. “New heating system development working with waste heat for electric vehicles.” Transportation Research Procedia 14 (2016): 1080-1086. https://www.sciencedirect.com/science/article/pii/S2352146516301806/pdf?md5=5c812db8e9c00381da3254e168336b65&pid=1-s2.0-S2352146516301806-main.pdf&_valck=1.

“Lithium Batteries for your Golf Cart” https://jsgolfcarts.com/blog/lithium-batteries-golf-cart/.

“COREMAX 72v 100ah lithium battery pack” https://www.coremax-tech.com/product/72-volt-golfcart-batteries-pack-for-sale-lifepo4-72v-100ah-golf-cart-lithium-ion-battery-pack/.

“2015-2022 RANGER EV Mid-Size Battery Care Basics” https://ranger.polaris.com/en-us/self-help/article/KA-01300/.

“Battery System (25_35_50 kWH Tesla Enclosures)—Electric GT” https://electricgt.com/shop/electric-gt-battery-systems/.

* cited by examiner

BATTERY BOX ASSEMBLY

CROSS REFERENCE TO RELATED APPLICATIONS

This application claims priority to and the benefit of earlier-filed U.S. Application No. 63/452,784, filed on Mar. 17, 2023, and entitled "Battery Box for Off-Road Vehicles", the contents and teachings of which are hereby incorporated by reference in their entirety.

BACKGROUND

A typical side-by-side vehicle provides transportation for passengers seated in a side-by-side manner. Some side-by-side vehicles may be equipped with cargo carrying rear beds (or decks), roll bars, etc. depending on use and application.

SUMMARY

Traditional side-by-side vehicles use internal combustion engines and gas tanks for fuel-based propulsion, and such vehicles are not intended to accommodate electric motors and rechargeable batteries for propulsion. Moreover, electric motors and rechargeable batteries impose different requirements/challenges, e.g., for operation, for installation, accessibility, safety, heat management, weight distribution, etc.

An improved technique involves a battery box for an electric off-road vehicle. Such a battery box richly and reliably stores and provides electric power to an electric motor for off-road vehicle propulsion. Along these lines, such a battery box protects a set of batteries against a harsh environment where moisture, dirt, etc. would otherwise impact operation. Moreover, the protection provided by such a battery box alleviates the need to use battery-related components (e.g., a battery management system or BMS, a DC/DC converter, a motor controller, etc.) that are individually rated/upgraded for harsh environments. Rather, standard rated components may be used while still enjoying protection against moisture, dirt, and so on. In accordance with certain embodiments, such a battery box is particularly well-suited for protecting a set of batteries from harsh conditions, for installation as a single assembly on a vehicle, is arranged to position batteries and related componentry for improved accessibility, is provisioned to provide operator safety, is configured for effective heat management, is suitable for operating a centrally-located differential, combinations thereof, etc.

One embodiment is directed to a battery box assembly. The battery box assembly includes a metallic skeleton. The battery box assembly further includes an insulative inner layer coupled with the metallic skeleton. The insulative inner layer faces an inner space defined by the metallic skeleton. The battery box assembly further includes an insulative outer layer coupled with the metallic skeleton. The insulative outer layer facing outwardly from the metallic skeleton.

In some embodiments, the battery box assembly further includes a set of inner walls disposed within the inner space and coupled with the insulative inner layer, the set of inner walls separating the inner space into multiple cavities.

In some embodiments, the set of inner walls separates the inner space into (i) a set of battery cavities constructed and arranged to house respective sets of battery modules and (ii) a component cavity constructed and arranged to house a set of electrical components configured to transfer power to and from the sets of battery modules.

In some embodiments, the insulative outer layer defines a bottom and a set of exterior walls that extend from the bottom. Further, the battery box assembly further includes a lid constructed and arranged to couple with the set of exterior walls. The lid, the bottom, and the set of exterior walls enclose the inner space when the lid is coupled with the set of exterior walls.

In some embodiments, the set of battery cavities includes at least two battery cavities. Further, the set of inner walls includes a first inner wall and a second inner wall. The first inner wall separates the at least two battery cavities from each other. The second inner wall separates the component cavity from the set of battery cavities. The second inner wall extends further from the bottom than the first inner wall to inhibit airflow between the component cavity and the set of battery cavities.

In some embodiments, the battery box assembly further includes a metallic plate constructed and arranged to couple with the lid and further couple with a set of upper frame members of an off-road vehicle to prevent the insulative outer layer from colliding with the set of upper frame members during a deflection event.

In some embodiments, the battery box assembly further includes a set of metallic fasteners constructed and arranged to couple with the metallic plate and the metallic skeleton. Additionally, the metallic plate and the set of metallic fasteners are constructed and arranged to connect the metallic skeleton to a chassis ground of the off-road vehicle.

In some embodiments, the battery box assembly further includes an interlock assembly constructed and arranged to couple with the metallic plate and maintain the sets of battery modules in a low voltage configuration when the lid is decoupled from the set of exterior walls.

In some embodiments, the lid, the bottom, and the exterior walls are constructed and arranged to form a watertight enclosure for the inner space when the lid is coupled with the set of exterior walls. Additionally, the battery box assembly further includes a pressure release assembly constructed and arranged to reduce pressure within the inner space when the lid is coupled with the set of exterior walls.

In some embodiments, a set of mounting members disposed within the compartment cavity constructed and arranged to mount the set of electrical components, the set of electrical components including a motor controller, a battery management system (BMS), and a DC/DC converter.

In some embodiments, the insulative inner layer defines a floor that mimics at least one top portion of a battery module. The floor is constructed and arranged to interface with at least one bottom portion of the sets of battery modules to vertically stack the sets of battery modules.

In some embodiments, the battery box assembly further includes a heat exchanger constructed and arranged to transfer heat from the component cavity to the set of battery cavities to warm the respective sets of battery modules.

In some embodiments, the battery box assembly further includes an electrical connections port coupled with the insulative outer layer, the electric connection port being constructed and arranged to provide access to the set of electrical components.

In some embodiments, the insulative outer layer includes a polymeric coating constructed and arranged to electrically and thermally insulate the inner space.

Another embodiment is directed to an off-road vehicle. The off-road vehicle includes a frame. The off-road vehicle further includes an electric motor coupled with one or more ground engaging members. The off-road vehicle further includes a battery box assembly disposed over the frame and constructed and arranged to provide power to the electric motor, the battery box assembly including:

A. a metallic skeleton;

B. an insulative inner layer coupled with the metallic skeleton, the insulative inner layer facing an inner space defined by the metallic skeleton; and C. an insulative outer layer coupled with the metallic skeleton, the insulative outer layer facing outwardly from the metallic skeleton.

In some embodiments, the battery box assembly further includes a set of inner walls disposed within the inner space and coupling with the insulative inner layer, the set of inner walls separating the inner space into (i) a set of battery cavities constructed and arranged to house respective sets of battery modules and (ii) a component cavity constructed and arranged to a set of electrical components configured to transfer power to and from the set of battery modules. Additionally, the set of battery cavities are disposed closer to a center of the off-road vehicle than the component cavity to provide the sets of battery modules closer to the center of the off-road vehicle.

Yet another embodiment is directed to a method of providing a battery box assembly. The method includes providing a metallic skeleton. The method further includes coupling an insulative inner layer with the metallic skeleton. The insulative inner layer facing an inner space defined by the metallic skeleton. The method further includes coupling an insulative outer layer with the metallic skeleton. The insulative outer layer facing outwardly from the metallic skeleton.

In some embodiments, the method further includes, after installing the respective sets of battery modules and installing the set of electrical components, inserting the battery box assembly into an off-road vehicle to provide the off-road vehicle with the sets of battery modules and the set of electrical components simultaneously.

Other embodiments are directed to apparatus, devices, and related componentry. Some embodiments are directed to various vehicles, equipment, assemblies, systems, sub systems, internal structures/configurations/arrangements, methods, and so on, which involve a battery box.

This Summary is provided merely for purposes of summarizing some example embodiments so as to provide a basic understanding of some aspects of the disclosure. Accordingly, it will be appreciated that various example embodiments disclosed herein are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Overview

Figure 1A:
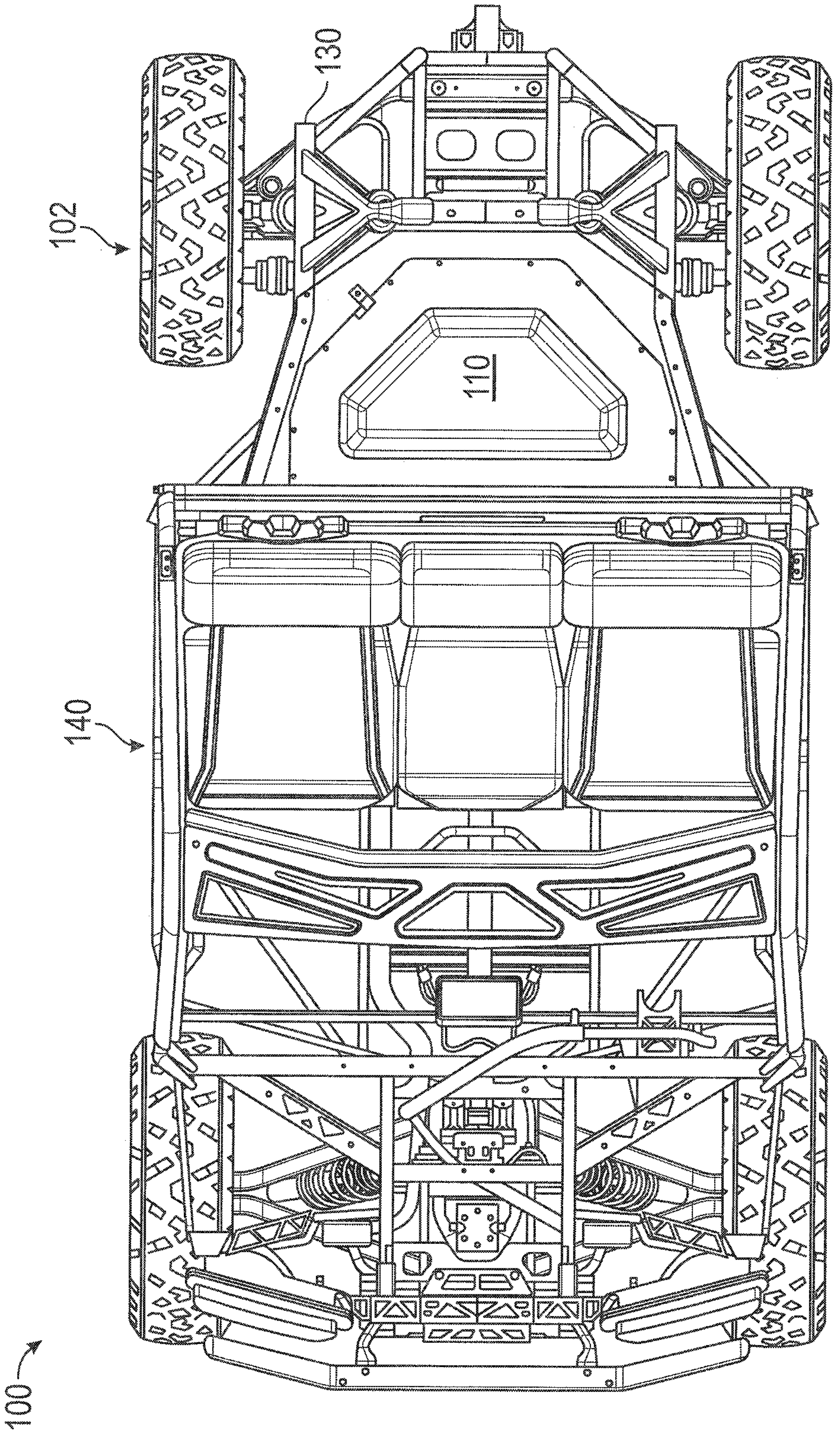
FIGS. 1A through 1H show an example electric vehicle constructed and arranged to house a battery box in accordance with certain embodiments.

Improved techniques are directed to battery boxes and off-road vehicles that utilize such battery boxes. Such battery boxes richly and reliably store and provide electric power to electric motors for off-road vehicle propulsion. Along these lines, such battery boxes protect batteries against harsh environments where moisture, dirt, etc. would otherwise impact operation. In accordance with certain embodiments, such battery boxes are particularly well-suited for protecting batteries from harsh conditions, for installation as single assemblies on vehicles, are arranged to position batteries and related componentry for improved accessibility, are provisioned for operator safety, are configured for effective heat management, are suitable for operating centrally-located differentials, combinations thereof, and so on.

It should be appreciated that the protection provided by such a battery box alleviates the need to use battery-related components (e.g., a battery management system or BMS, a DC/DC converter, a motor controller, etc.) that are individually rated/upgraded for harsh environments. Rather, standard rated components may be used while still enjoying protection against moisture, dirt, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

Electric Vehicle Details

FIGS. 1A through 1H show an example electric vehicle 100 constructed and arranged to house a battery box 110 in accordance with certain embodiments. In some embodiments, the electric vehicle 100 includes one or more ground-engaging members 102 (e.g., four tires), operator controls 104, and other components constructed and arranged to richly and robustly support operation of the electric vehicle 100. In some embodiments, the battery box 110 is constructed and arranged to provide electric power to an electric motor 120 for vehicle propulsion. In some embodiments, the electric vehicle 100 is a side-by-side (SxS) or other 4-wheel recreational vehicle.

Certain portions of the electric vehicle 100 (e.g., exterior panels, doors, a hood, a cargo bed, etc.) may have been omitted from these figures for simplicity and/or to better show other details of the electric vehicle 100.

Figure 1B:
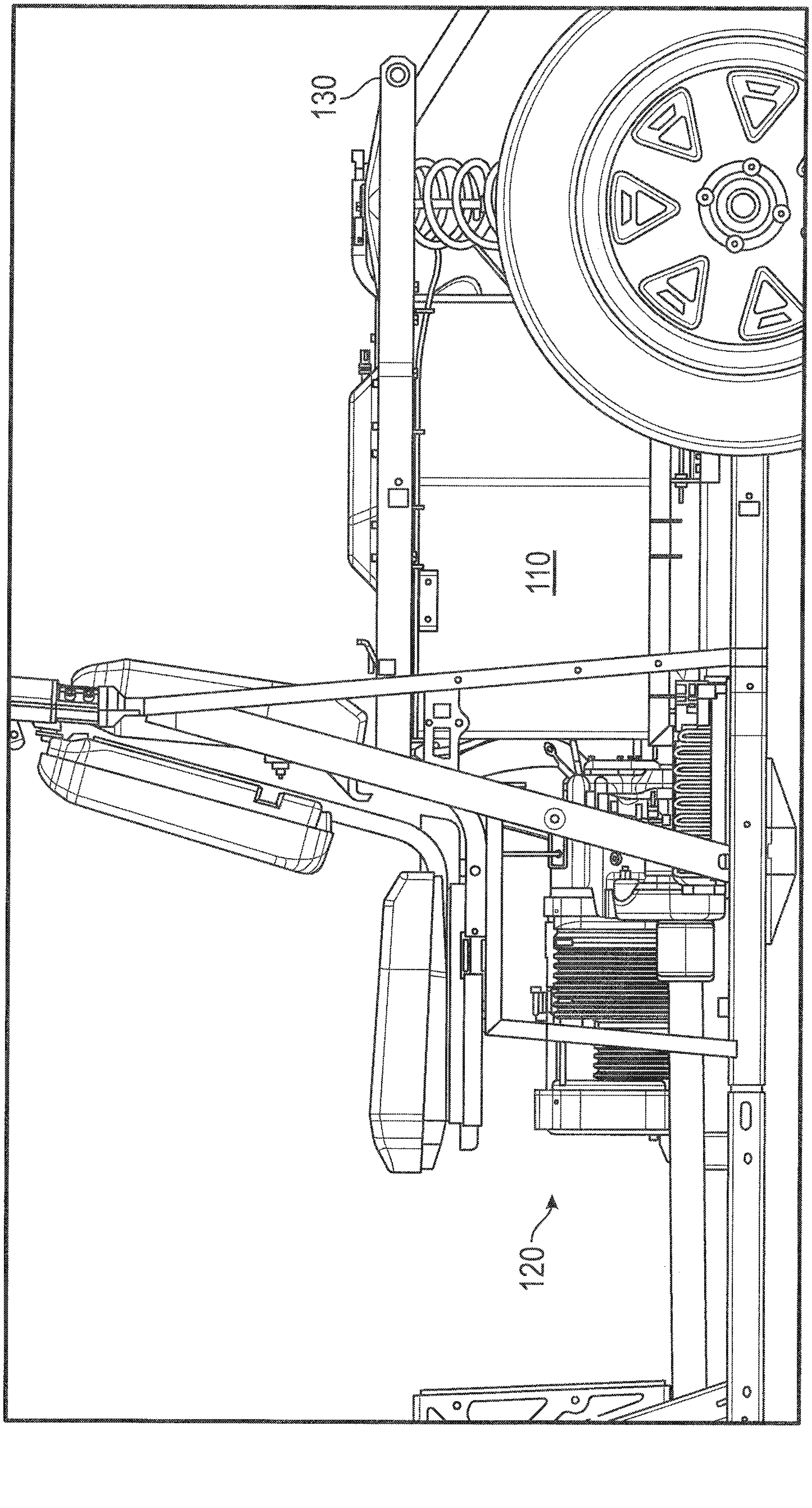

As best shown in FIG. 1B, in some embodiments, the electric vehicle 100 includes a vehicle frame 130 constructed and arranged to support the battery box 110, the electric motor 120, and/or other components of the electric vehicle 100. In some embodiments, the vehicle frame 130 is further constructed and arranged to support an internal combustion engine (ICE) and a fuel tank (rather than or in addition to the electric motor 120 and/or the battery box 110) to form a combustion engine vehicle or hybrid electric vehicle. In some arrangements, the vehicle frame 130 defines a seating area 140 to seat passengers in a side-by-side arrangement.

Figure 1C:
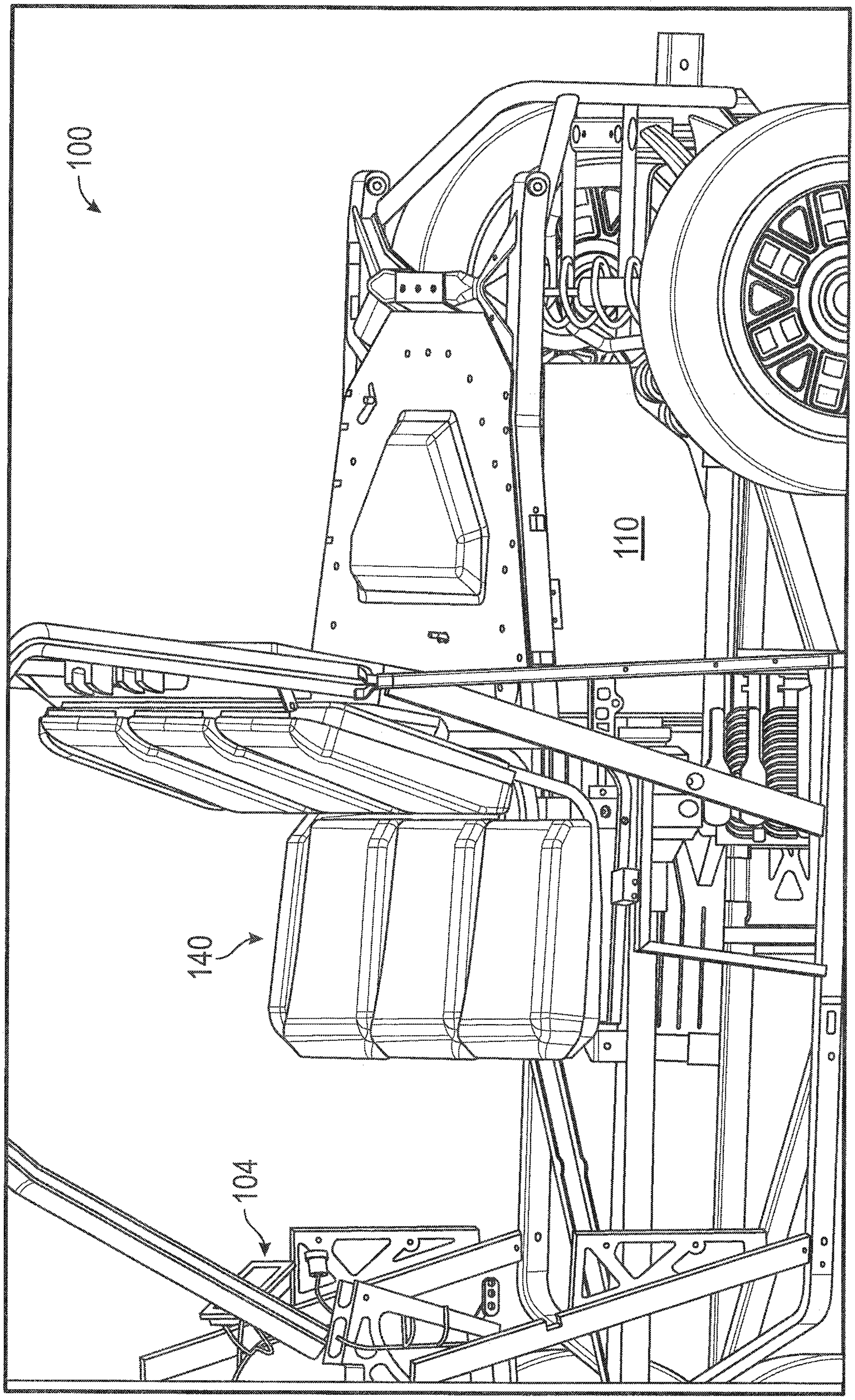
Figure 1D:
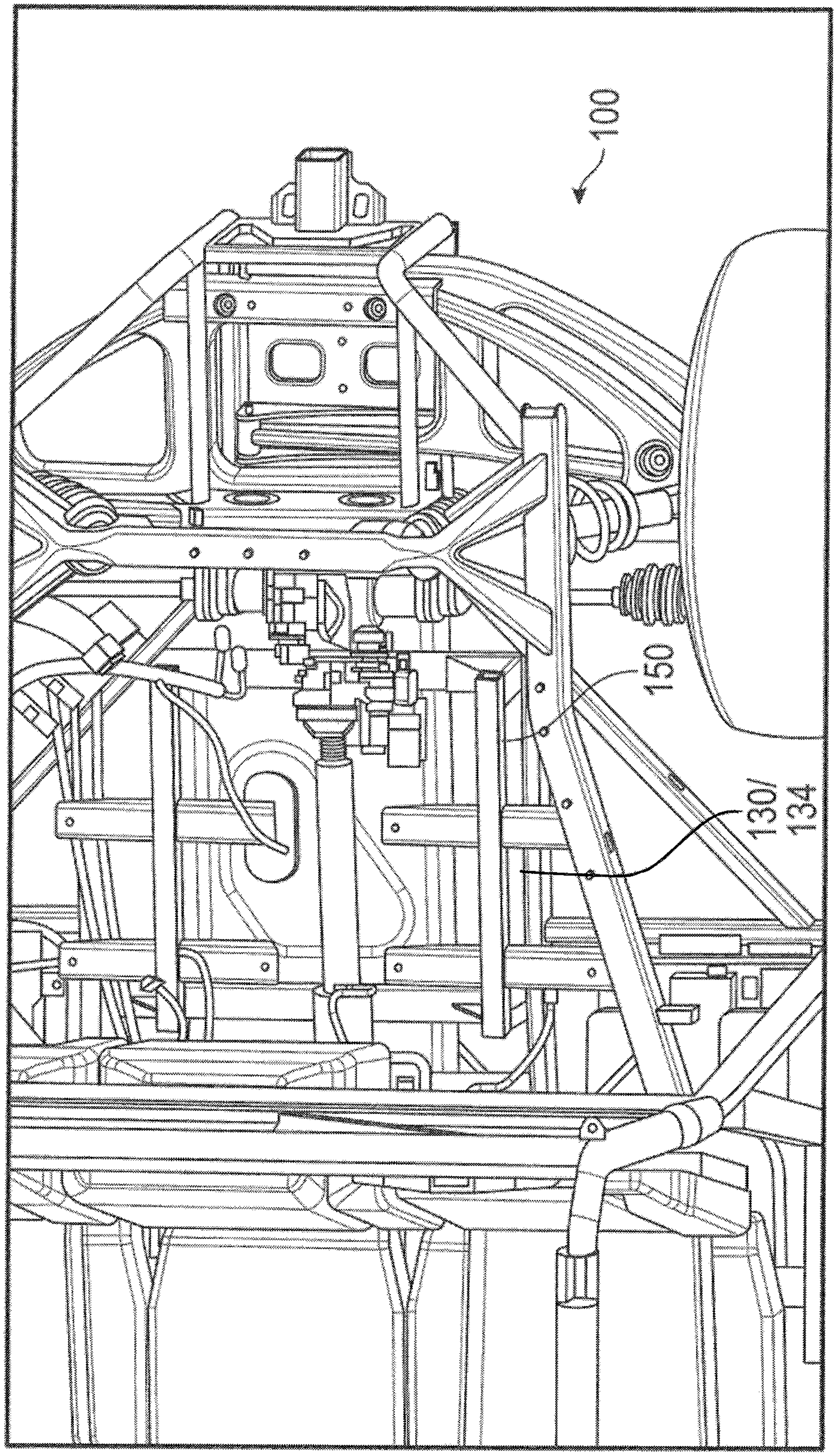

FIG. 1D shows the electric vehicle 100 with one or more components removed to show additional details in accordance with certain embodiments. As shown, the electric vehicle 100 includes a cradle (or scaffold) structure 150 which is constructed and arranged to mount to a bottom/rear portion 134 of the vehicle frame 130 to richly and reliably provide support and enable mounting of the battery box 110 as a unitary subassembly. However, it should be understood that the cradle structure 150 is provided for example purposes, and in some embodiments, a bottom of the battery box is constructed and arranged to fasten to the vehicle frame 130 directly. In some embodiments, the cradle structure 150 is added to an existing internal combustion engine frame. Additionally or alternatively, in some embodiments, the cradle structure 150 is removed or simply omitted, e.g., to transition the vehicle frame 130 from being equipped to support the battery box 110 and enabling the vehicle frame 130 to serve as a frame for a combustion engine vehicle. Accordingly, the vehicle frame 130 is well suited as a frame for different types of vehicles.

Figure 1E:
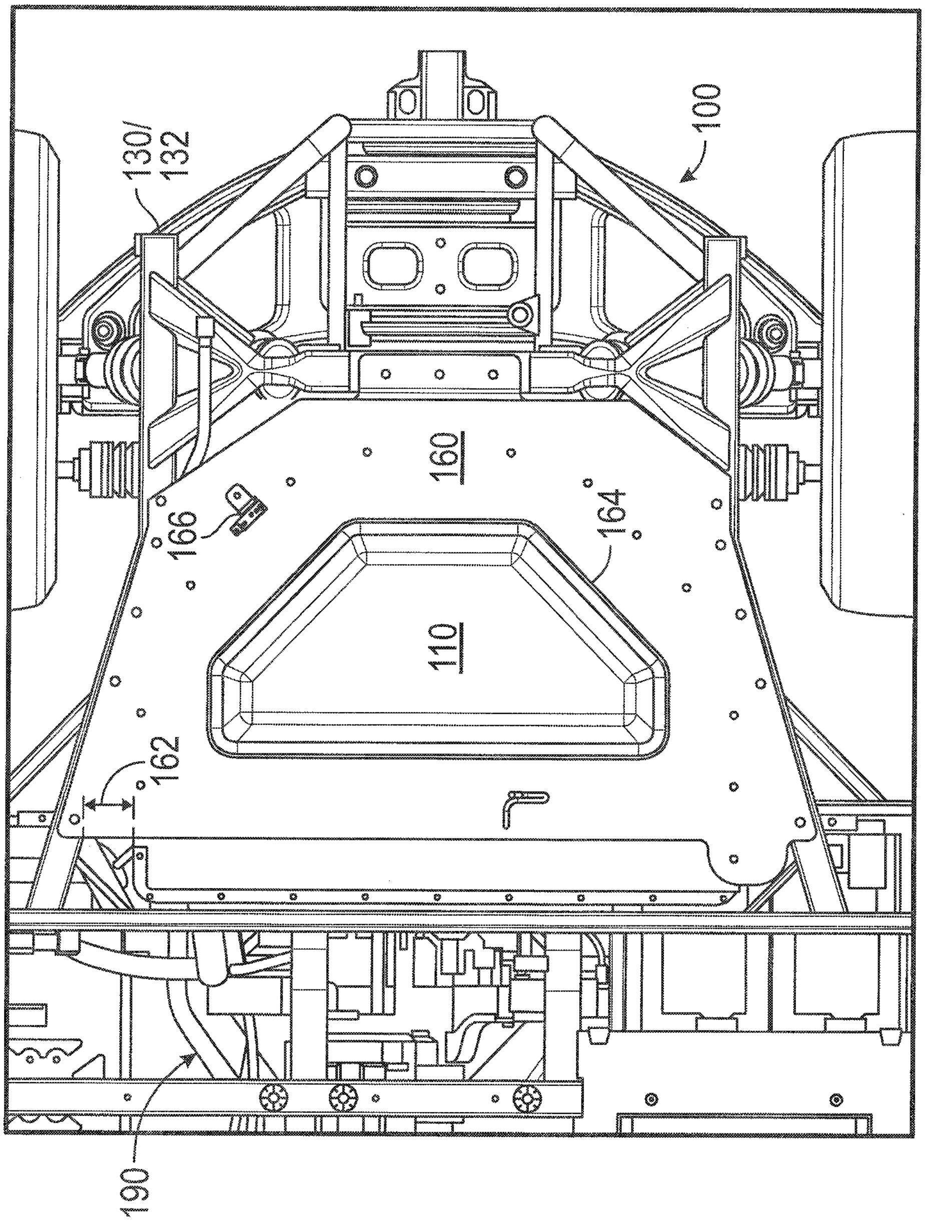
Figure 1F:
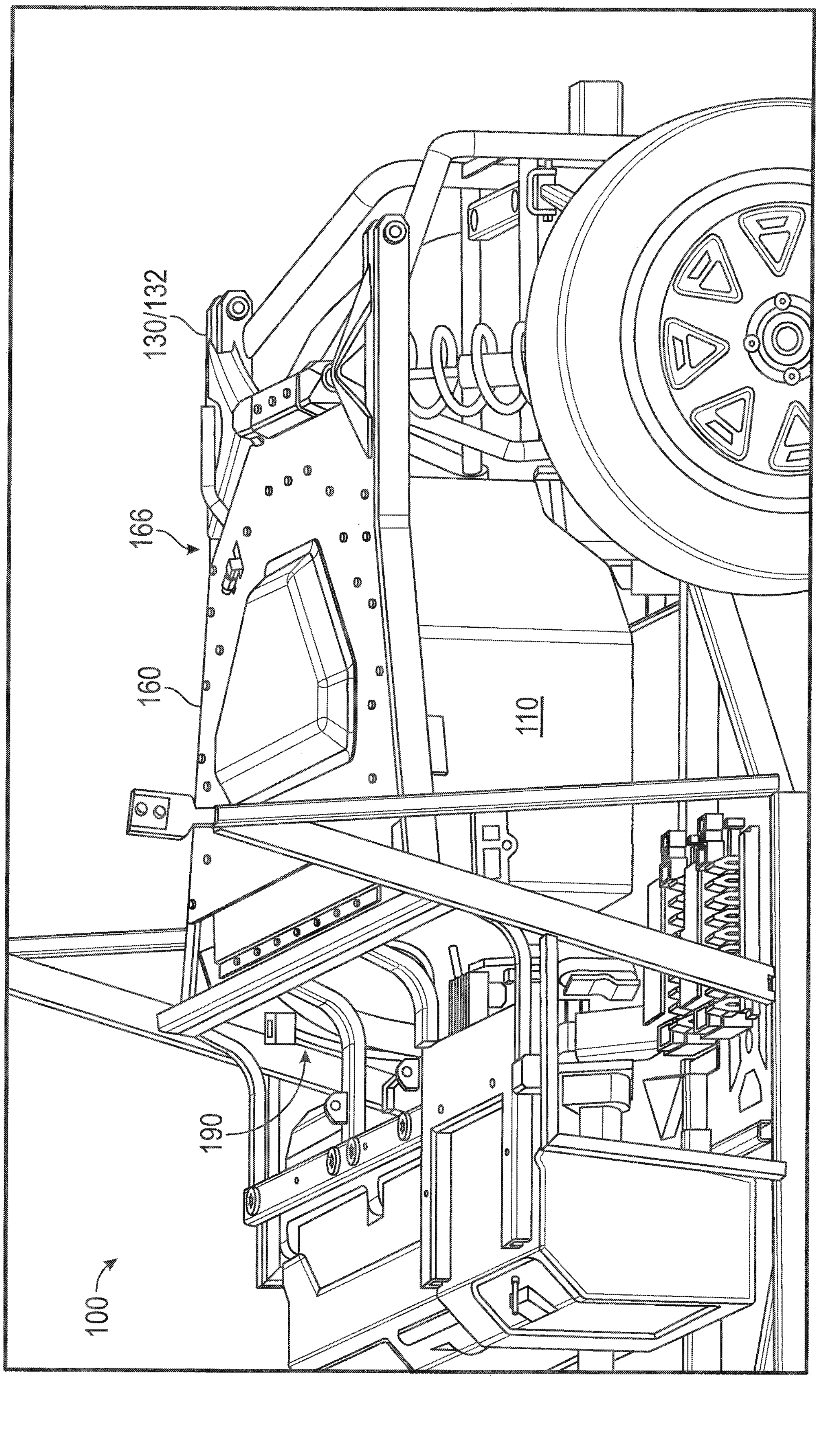

As best shown in FIGS. 1E-1F, in some embodiments, the electric vehicle 100 includes a top plate 160 constructed and arranged to secure the battery box 110 to an upper portion 132 of the vehicle frame 130 and maintain a gap (or open space) 162 around the battery box 110 to prevent the top of the battery box 110 from contacting the upper portion 132 of the vehicle frame 130 directly (e.g., during deflection events such as high acceleration or maneuvering over rough terrain). In some embodiments, the top plate 160 is removably fastened, e.g., for servicing, ease of installation, combinations thereof, etc.

In some embodiments, the top plate 160 defines an opening 164 that allows a portion of a lid of the battery box 110 to extend therethrough. In some embodiments, the top plate 160 is constructed and arranged to reduce a load on the subcradle underneath it.

In some embodiments, the top plate 160 is metallic and is constructed and arranged to serve as an extension of chassis ground (e.g., by coupling the battery box 110 with the vehicle frame 130). Accordingly, the top plate 160 both holds the top of the battery box 110 in place as well as provides electrical protection.

In some embodiments, the battery box 110 and/or the top plate 160 are equipped with an interlock device 166. As will be described in greater detail below, in some embodiments, the interlock device 166 is constructed and arranged to disable certain electrical features when the interlock device 166 is removed (e.g., to then remove the metallic plate and access the battery box) to provide a safeguard to a user of the electric vehicle 100.

Figure 1G:
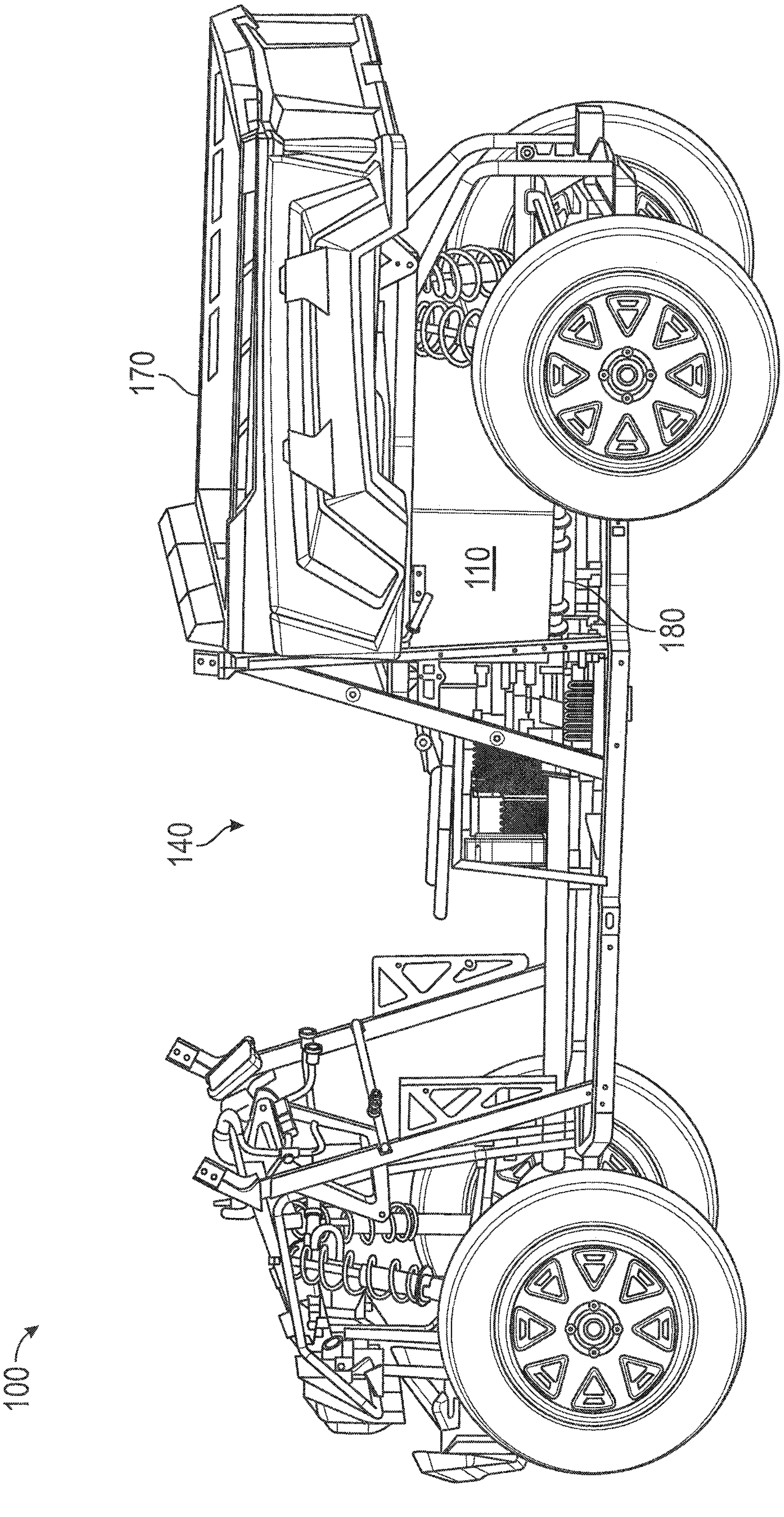
Figure 1H:
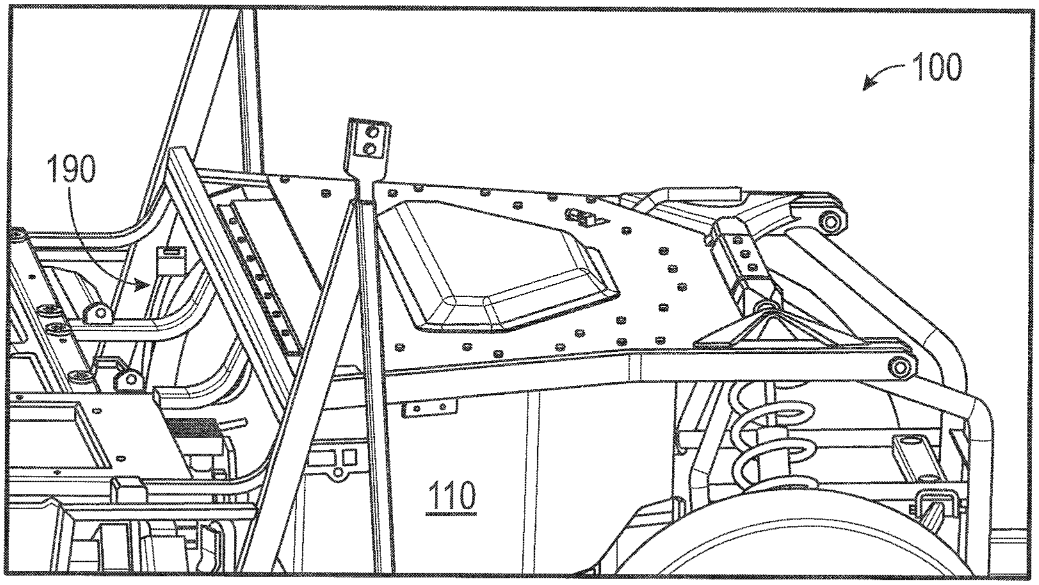

As best shown in FIG. 1B, in some embodiments, the battery box 110 is disposed behind the seating area 140 (e.g., behind a set of side-by-side seats). Furthermore, as best shown in FIG. 1G, in some embodiments, the battery box 110 resides between a cargo bed 170 and drive train components (e.g., components of an electric powertrain 180 of the electric vehicle 100).

In some embodiments, the cargo bed 170 is coupled with the vehicle frame 130 above the battery box 110 and is constructed and arranged to pivot relative to the vehicle frame 130 to provide access to the battery box 110.

As best shown in FIGS. 1E and 1F, in some embodiments, the electric vehicle 100 is equipped with ducting 190 (e.g., molded features) for heat management. As will be discussed in greater detail below, such ducting 190 enables fluid and/or air flow to be redirected.

During an example installation operation, the battery box 110 is lowered onto or dropped in from above the vehicle frame 130 in an assembly/production line manner. In some embodiments, the top plate 160 is then installed over the battery box 110 to secure the battery box 110 to the upper portion 132 of the vehicle frame 130. Further, in some embodiments, the electric motor 120 and/or other electrical components are then simply plugged into ports on the exterior of the battery box 110. Further, other componentry may be installed (e.g., the cargo bed 170, the ducting 190, combinations thereof, etc.).

Electric Vehicle Details (e.g., Electric Powertrain)

Figure 2A:
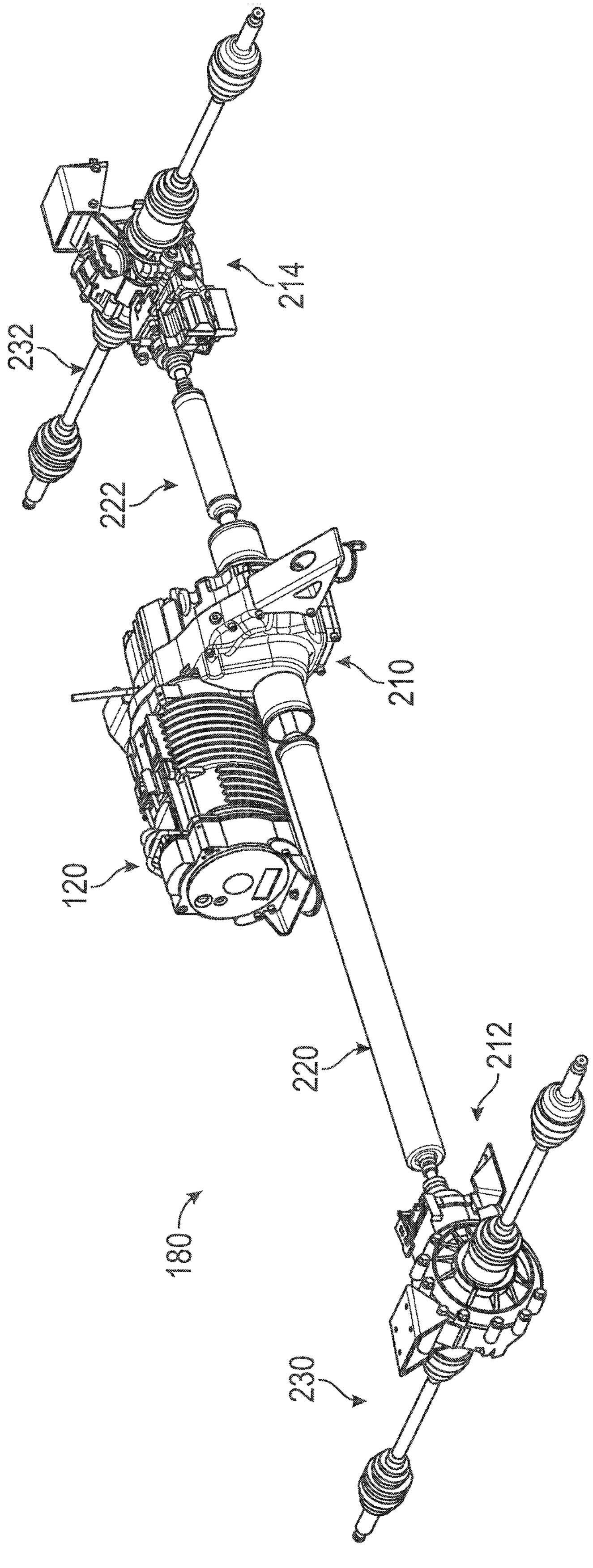
FIGS. 2A and 2B shows additional details of an electric powertrain of the electric vehicle in accordance with certain embodiments.
Figure 2B:
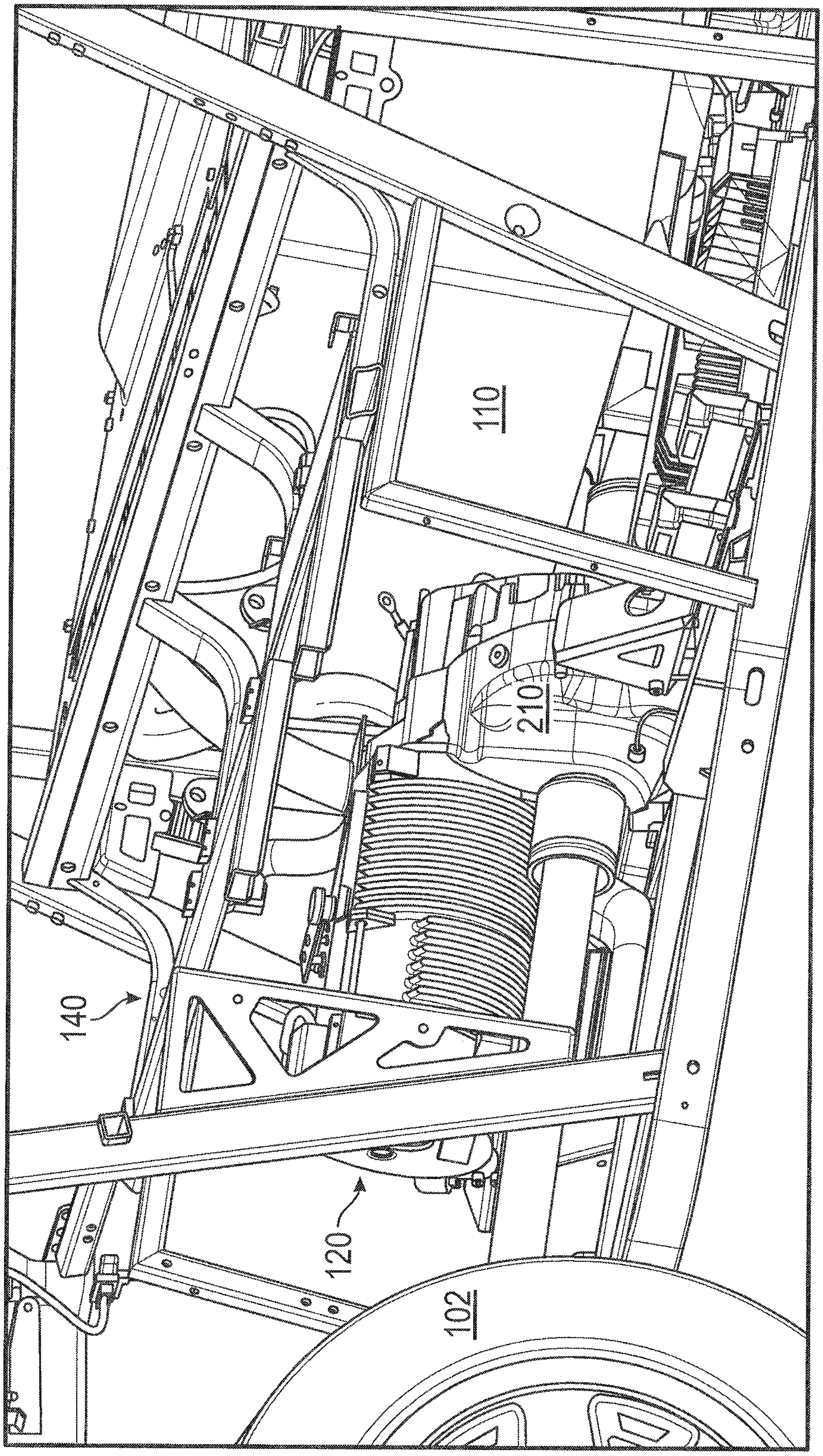

FIGS. 2A and 2B shows additional details of the electric powertrain 180 of the electric vehicle 100 in accordance with certain embodiments. In some embodiments, the electric powertrain 180 is constructed and arranged to receive power from the electric motor 120 and interface with the ground-engaging members 102 to move the electric vehicle 100.

As shown, the electric powertrain 180 includes a centrally located differential (center differential 210) constructed and arranged to interface with the electric motor 120. In some embodiments, the electric motor 120 and center differential 210 connect to a front differential 212 and a rear differential 214 via respective driveshafts 220, 222 as shown in FIG. 2A. Accordingly, the center differential 210 operates in a manner similar to that of a motor transfer case that connects to the front differential 212 and the rear differential 214. In some embodiments, the front differential 212 and rear differential 214 are connected with the ground-engaging members 102 (FIG. 1A) via respective axles 230, 232.

As shown in FIG. 2B, in some embodiments, the center differential 210 and/or the electric motor 120 resides beneath the seating area 140, as shown in FIG. 2B. Along these lines, as shown, the electric motor 120 is arranged in a mid-motor configuration with the electric motor 120 positioned under the seating area 140 forward of the battery box 110. In some embodiments, the battery box 110 is positioned between the seating area 140 (and the electric motor 120) and the rear differential 214 and/or the rear axle 232, underneath the upper portion 132 of the vehicle frame 130 that supports the cargo bed 170 (FIG. 1G).

Such a configuration enables the electric motor 120 to be positioned more centrally in the vehicle as well as enables the battery box 110 to be positioned more to the rear (e.g., as shown in FIGS. 1A through 1C). Such placement provides effective weight distribution and low center of gravity for healthy and reliable vehicle operation/control.

It should be understood that the electric powertrain 180 is provided for example purposes, and variations may be made without departing from the spirit and scope of the present disclosure.

Battery Box Overview

FIGS. 3A through 3F show particular features of the battery box 110 in accordance with certain embodiments. As will be described in further detail below, in some embodiments, the battery box 110 contains one or more compartments for storing battery modules constructed and arranged to provide electric power to the electric motor 120 for vehicle propulsion. Further, in some embodiments, the battery box 110 contains one or more compartments for storing additional components such as a motor controller, a battery management system, a DC/DC converter, etc.

Certain portions of the battery box 110 (e.g., a lid, battery modules, other componentry, etc.) may have been omitted from these figures for simplicity and/or to better show other details of the battery box 110.

Figure 3A:
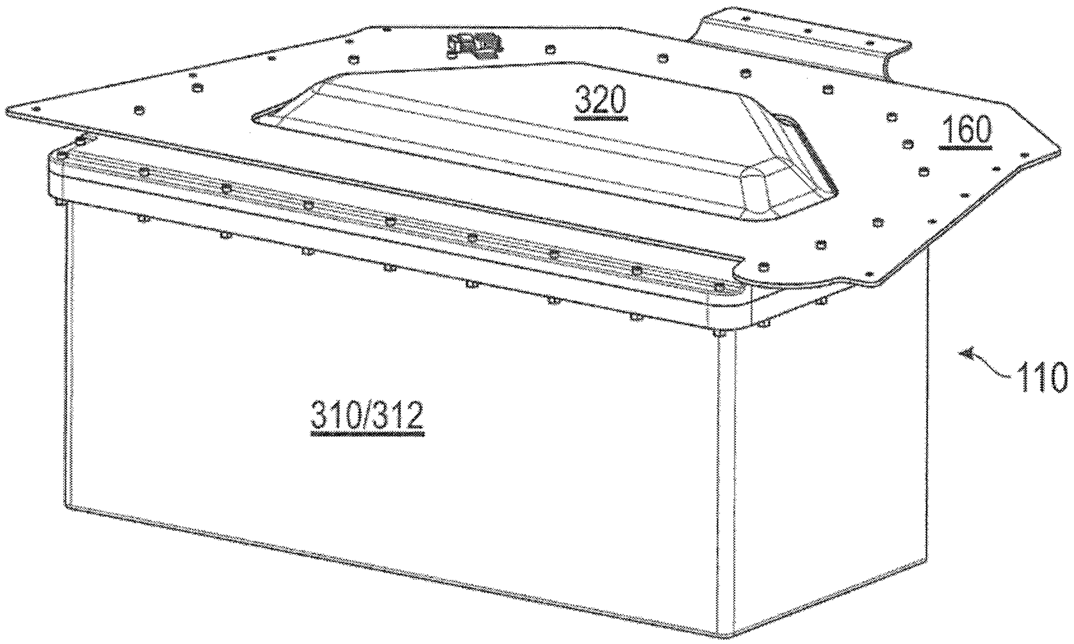
FIGS. 3A through 3F show particular features of the battery box in accordance with certain embodiments.

As best shown in FIG. 3A, the battery box 110 includes a body portion 310 and a lid 320. In some embodiments, the body portion 310 includes a set of exterior walls 312 constructed and arranged to provide housing for one or more battery modules. In some embodiments, the set of exterior walls 312 are metal reinforced, e.g., to serve as a self-standing structure without the need for additional chassis reinforcements. In some embodiments, a metal structure supporting the set of exterior walls 312 is over-molded with a polymeric material constructed and arranged to insulate components from heat and/or voltage.

In some embodiments, the lid 320 is constructed and arranged to cover an inner space of the body 310. Further, in some embodiments, the top plate 160 (FIGS. 1E and 1F) is constructed and arranged to secure both the lid 320 and the battery box 110 to the electric vehicle 100. Accordingly, the top plate 160 provides a way to fasten the battery box 110 to the chassis of the electric vehicle 100 while maintaining a gap 162 therebetween to prevent unwanted contact during operation.

It should be appreciated that, in some embodiments, the battery box 110 is constructed and arranged to provide high voltage (e.g., 60 volts or higher) for electric propulsion when the battery box 110 is sealed. Nevertheless, the battery box 110 is further constructed and arranged to safely isolate the circuitry to protect human operators.

In some embodiments, a control panel is provided on the side of the battery box 110 in a region of the vehicle that is easily accessible. Further, in some embodiments, one or more interlock devices is provided on the lid/plate/control panel to transfer the electrical components/battery from a high voltage configuration to a low voltage configuration if the lid is removed.

Additionally, the battery box 110 provides rich and robust water maintenance to keep the battery box components dry. Accordingly, in some embodiments, the battery box components themselves do not need to be modularized/protected/higher-durability-rated due to battery box protection. Thus, the individual components may be standard (or lower) rated. Additionally, such features enable a reduction in space requirements, cost, complexity (e.g., in manufacturing, maintenance, etc.), and so forth.

In some embodiments, the battery box 110 is constructed and arranged to position the battery modules at the forward end of the battery box 110 so that the battery modules are located close to the electric motor 120 and/or an engine compartment of the electric vehicle 100. In some embodiments, the battery modules are organized in one or more stacks that include four battery modules per stack. Positioning the stacks near the electric motor 120 and/or the engine compartment is advantageous for positioning more of the weight closer to vehicle center (e.g., between the axles 230, 232 (FIG. 2A)).

In some embodiments, the compartments are separated so that heat and/or fluid transfer from one side to the other is restricted (although vents may be provided to control the transfer of heat if desired). Furthermore, in some embodiments, heat is recouped from various components such as a motor controller, a BMS, a DC/DC converter, etc. and used to regulate temperature within the battery box 110 as well as provided to external locations as needed. Accordingly, in some embodiments, the battery box 110 is provisioned with and/or serves as a battery module and/or a heat producing component module.

Battery Box Details (e.g., Additional Inner Features)

FIGS. 3B through 3F show various perspective views of the battery box 110 with the lid 320 removed in accordance with certain embodiments.

Figure 3B:
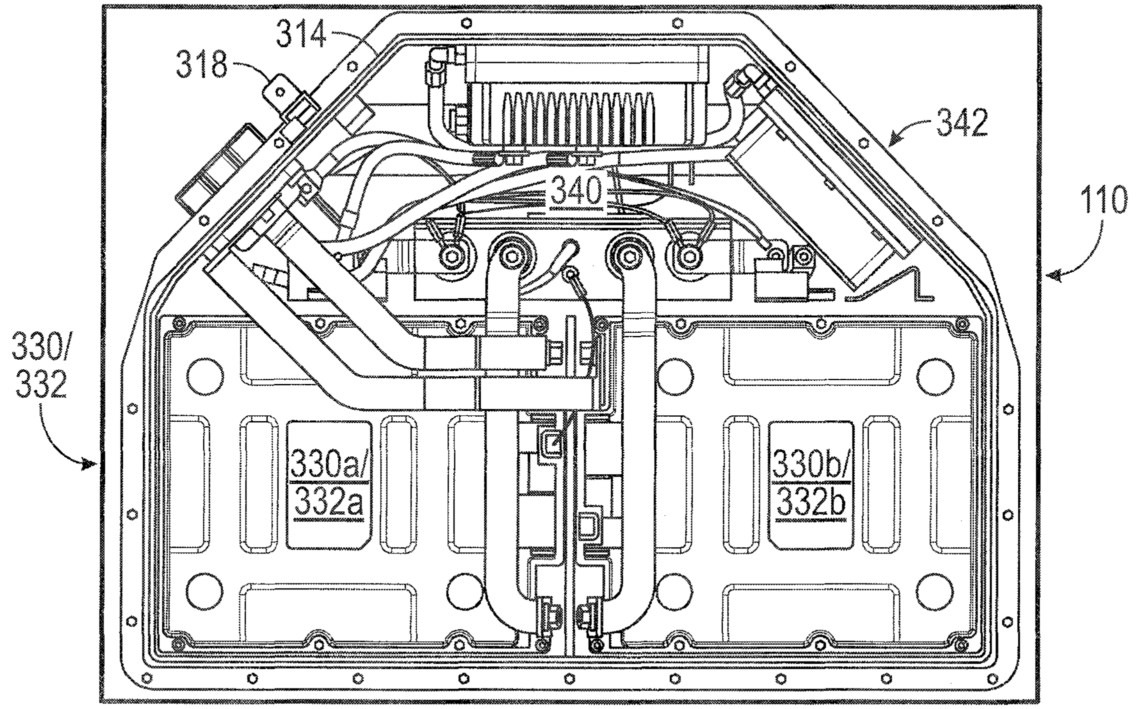
Figure 3C:
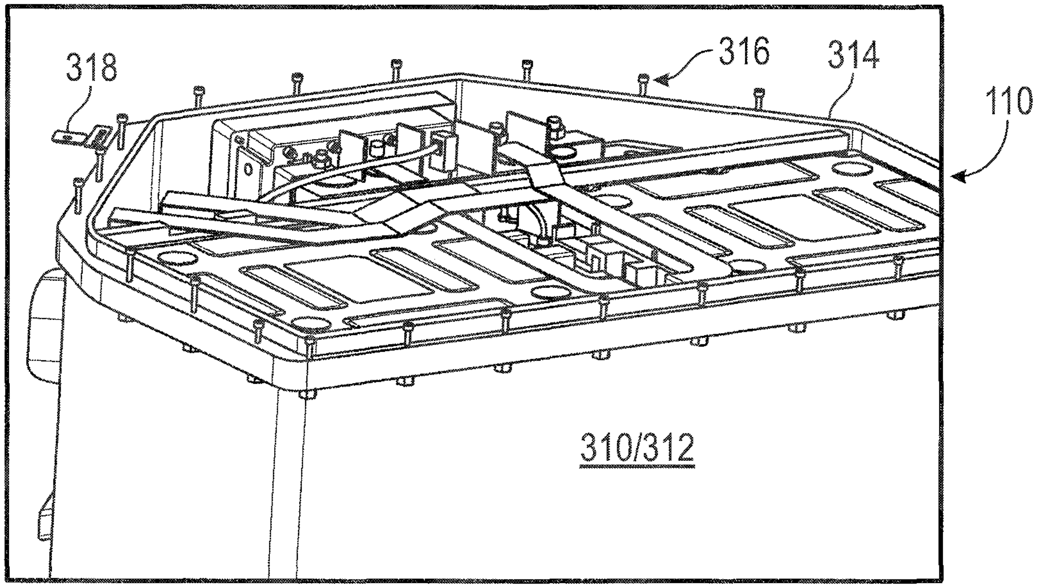

As best shown in FIGS. 3B and 3C, in some embodiments, a seal 314 is provided around the set of exterior walls 312 of the battery box 110. In some embodiments, the seal 314 is compressible and/or elastomeric. In some embodiments, the seal 314 is constructed and arranged to be compressed against the underside of the lid 320 when a set of fasteners 316 positioned along the flange are tightened, e.g., to provide a watertight connection for the battery box 110. In some embodiments, the set of fasteners 316 are constructed and arranged to apply even pressure to seal a perimeter of the body 310, as shown in FIG. 3A. In this manner, the body 310 and lid 312 provide a watertight seal for the battery box 110.

In some embodiments, the set of fasteners 316 is constructed and arranged to couple the lid 320 and the body 310 along with a clasp 318 (or similar continuity detection device). As will be discussed in further detail below, in some embodiments, the clasp 318 is constructed and arranged to facilitate lid removal detection, e.g., to protect a user from high voltage.

As shown best in FIG. 3B, in some embodiments, the battery box 110 defines multiple battery cavities 330*a*, 330*b* (collectively, battery cavities 330) constructed to house respective sets of battery modules 332*a*, 332*b* (collectively, sets of battery modules 332). In some embodiments, the sets of battery modules 332 are separated into respective vertical stacks (e.g. two vertical stacks of four respective battery modules). In some embodiments, each battery module is self-contained in plastic. As further shown, in some embodiments, the battery box 110 further defines a component cavity 340 constructed and arranged to house a set of electric components 342. Advantageously, this configuration minimizes/eliminates brackets and isolates the componentry to keep moisture out (i.e., dry cavities).

It should be understood that the battery cavities 330 and/or the component cavity 340 are provided for example purposes, and in some embodiments, more or fewer cavities are provided. Further, in some embodiments, the battery box 110 houses more or fewer battery modules, houses battery modules horizontally, combinations thereof, etc.

In some embodiments, the battery cavities 330 are positionable towards the center of the electric vehicle 100 so that the sets of battery modules 332 are located near a desired center of gravity. In some embodiments, the component cavity 340 is positionable rearward of the battery compartment.

Figure 3D:
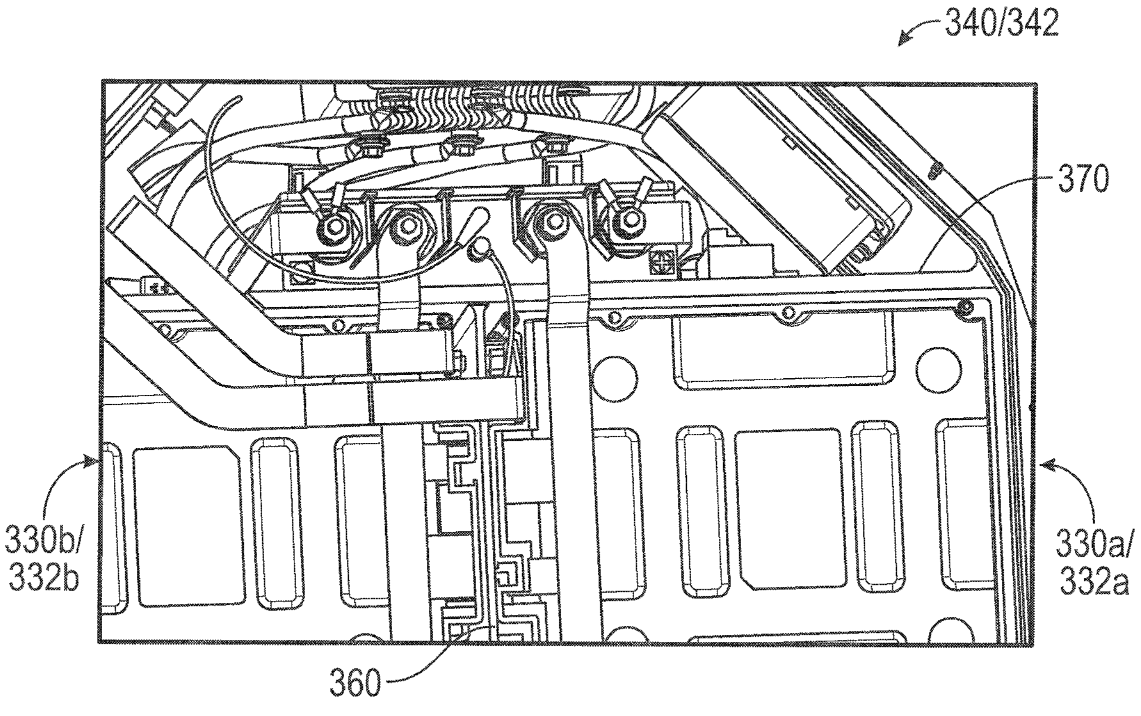
Figure 3E:
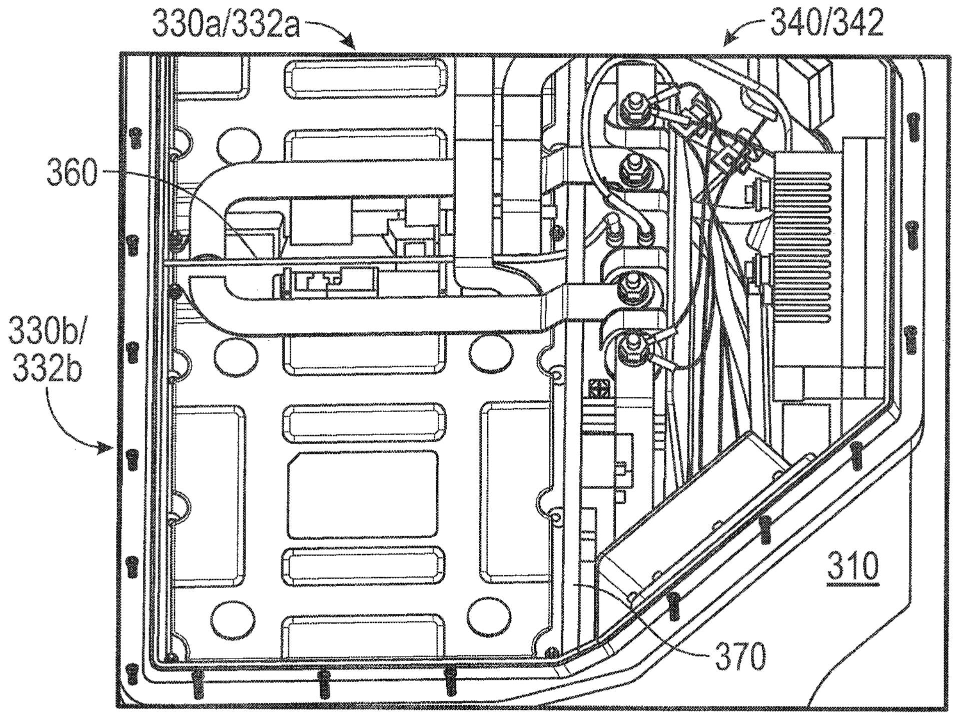

As best shown in FIGS. 3D and 3E, in some embodiments, the battery box 110 includes a first inner wall 360 (e.g. a divider) that sits between the battery cavities 330*a*, 330*b*. In some embodiments, the first inner wall 360 is an electrically insulating barrier (or wall) constructed and arranged to isolate battery terminals between battery stacks. Along these lines, in some embodiments, the first inner wall 360 is constructed and arranged to prevent terminals between the individual sets of battery modules 332 from connecting each other without the first inner wall 360 being destroyed.

In some embodiments, this insulating barrier is made of plastic (or rubber, etc.). For example, in some embodiments, the insulating barrier between the battery stacks is solid plastic. In some embodiments, the insulating barrier provided without metal reinforcement.

In some embodiments, at least part of the first inner wall 360 does not contact the lid 320 when the lid 320 is installed. In this manner, the first inner wall 360 permits heat venting between the battery cavities 330 during operation.

Figure 3F:
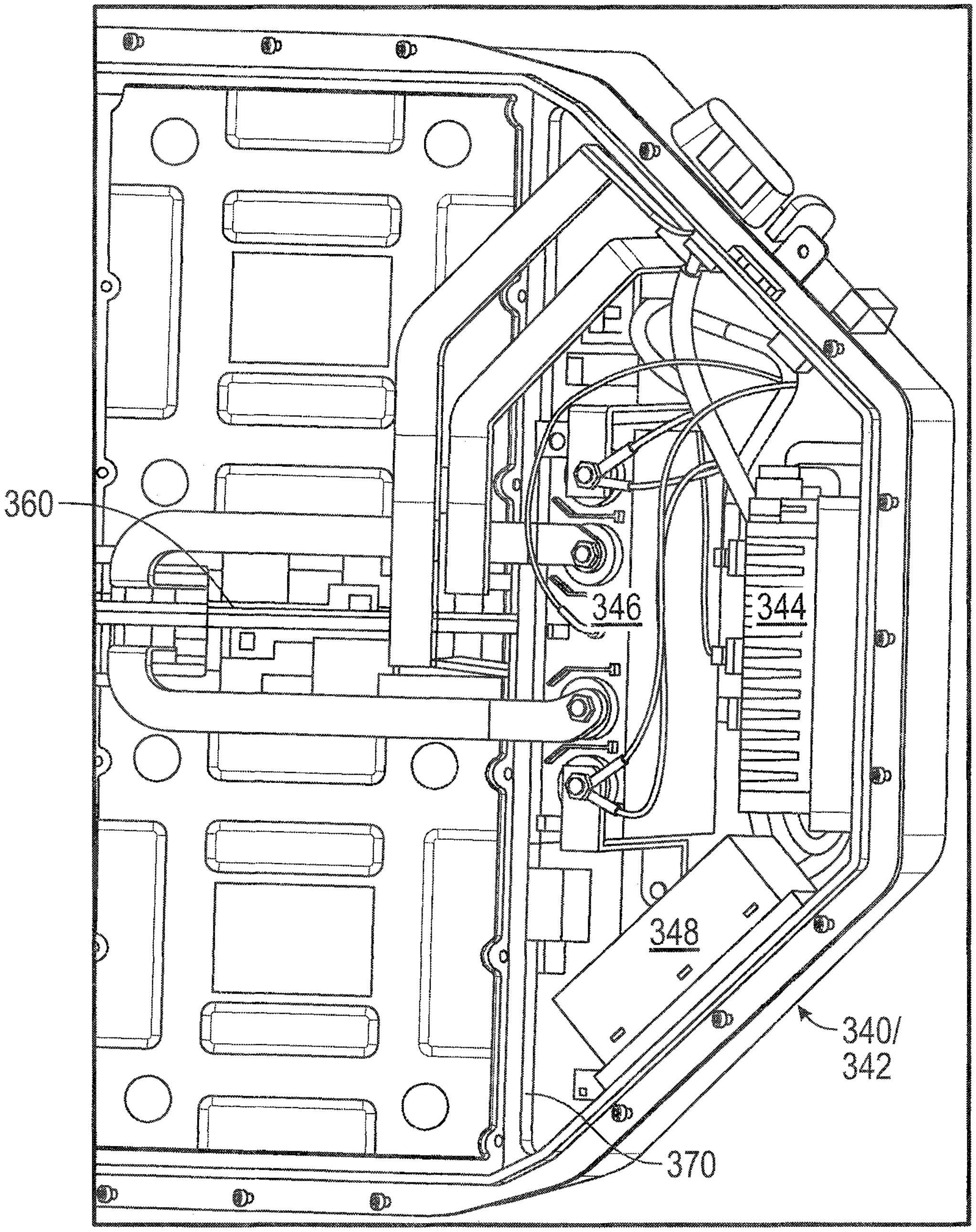

As best shown in FIG. 3F, in some embodiments, the battery box 110 includes a second inner wall 370 that separates the sets of battery modules 332 from other components (e.g., the motor controller 344, the BMS 346, the DC/DC converter 348, etc.). In some embodiments, the second inner wall 370 is metal reinforced and solid.

In some embodiments, the second inner wall 370 is high enough to completely separate the battery stacks from the other components so that the second inner wall 370 prevents airflow between the compartments when the lid 320 is positioned thereon (e.g., the second inner wall 370 completely separates the battery cavities 330 from the component cavity 340).

In some embodiments, the BMS 346 is constructed and arranged to mount on a reinforced bulkhead separating the component cavity 340 from the battery cavities 330, which puts it in a position adjacent the sets of battery modules 332 to shorten the wiring therebetween while still maintaining electrical and/or heat isolation.

In some embodiments, the DC/DC converter 348 and/or the motor controller 344 are constructed and arranged to mount on an outer wall of the component cavity 340, e.g., so that fluid heat exchangers may be utilized to cool these components and the fluid ports can be located at the periphery where it is easy to access and install. Similarly, in some embodiments, an electrical interface is positioned on an outer wall of the component cavity 340, e.g., to provide easy access during installation and maintenance.

As will be discussed in greater detail below, in some embodiments, at least a portion of the lid 320 projects upwardly to accommodate larger components (such as the BMS 346 (see, e.g., FIG. 3F)). In these embodiments, the second inner wall 370 is constructed and arranged to extend upward into the projection when the lid 320 is attached.

In some embodiments, the second inner wall 370 is extends further from a bottom (or floor) of the battery box 110 than the first inner wall 360 between the sets of battery modules 332, e.g., to allow air to cross (or circulate) between the sets of battery modules 332.

As best shown in FIG. 3F, the set of electric components 342 is disposed within the component cavity 340. In some embodiments, the set of electric components 342 includes a motor controller 344, a battery management system (BMS) 346, a DC/DC converter 348, relays/contactors/isolation monitoring device(s), and perhaps other componentry. In some arrangements, one or more of these components (e.g., an isolation monitoring device) is isolated from chassis ground. If a fault is detected by the isolation monitoring device, the isolation monitoring device shuts down the system (e.g., places the componentry into a safe state).

In some embodiments, the motor controller 344 is constructed and arranged to provide instructions to the electric motor 120 for vehicle propulsion.

In some embodiments, the BMS 346 is constructed and arranged to provide control between the battery modules and outside world, e.g., to allow proper voltage and current for vehicle operation.

In some embodiments, the DC/DC converter 348 is constructed and arranged to act similarly to an alternator on a gas engine that receives a high voltage input and provides a lower voltage output (e.g., 12*v*).

In some embodiments, the battery cavities 330 are oriented closest to the seating area 140 of the electric vehicle 100, and the component cavity 340 is farthest from the seating area 140. Such an orientation provides certain advantages such as placing the batteries nearest to the passengers for possible heat sharing, placing non-battery components away from the seats for easier access, and so on.

It should be appreciated that, in accordance with certain embodiments, placing the sets of battery modules 332 in the front of the battery box 110 adjacent the seating area 140 helps keep weight towards a middle (or center) of the electric vehicle 100. Further, in accordance with certain embodiments, placing the set of electrical components 342 in the rear of the battery box 110 away from the seating area 140 allows for easy accessibility when connecting/disconnecting outside components to the battery box 110.

Moreover, it should be appreciated that the above-described orientation is particularly well suited for the electric vehicle 100 in which the rear differential (i.e., the differential in the back that operates the rear wheels) takes up space underneath.

Battery Box Details (e.g., Lid)

Figure 4A:
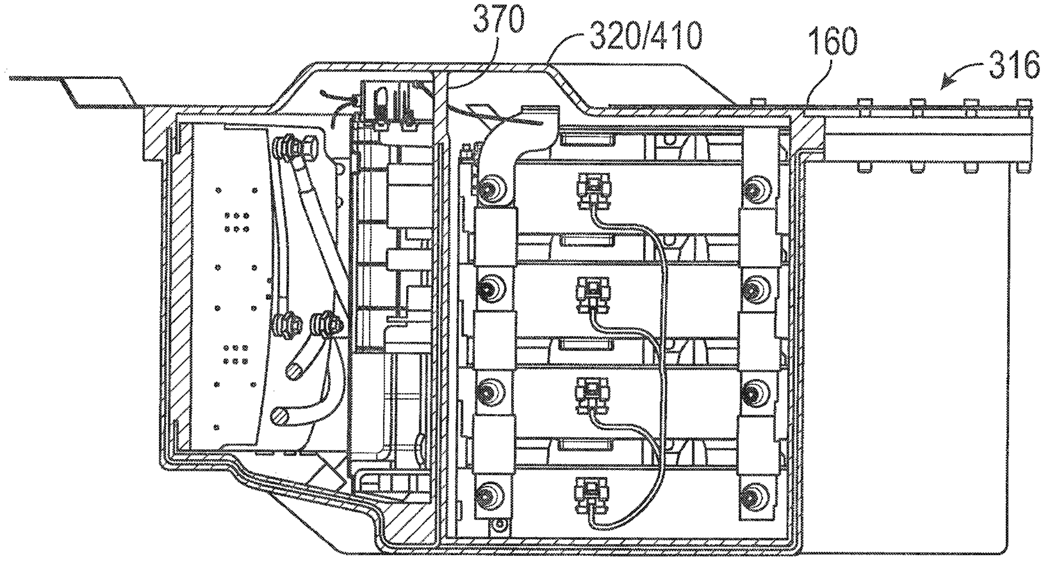
FIGS. 4A and 4B show various cross-sectional views of the battery box with a lid and a top plate attached in accordance with certain embodiments.
Figure 4B:
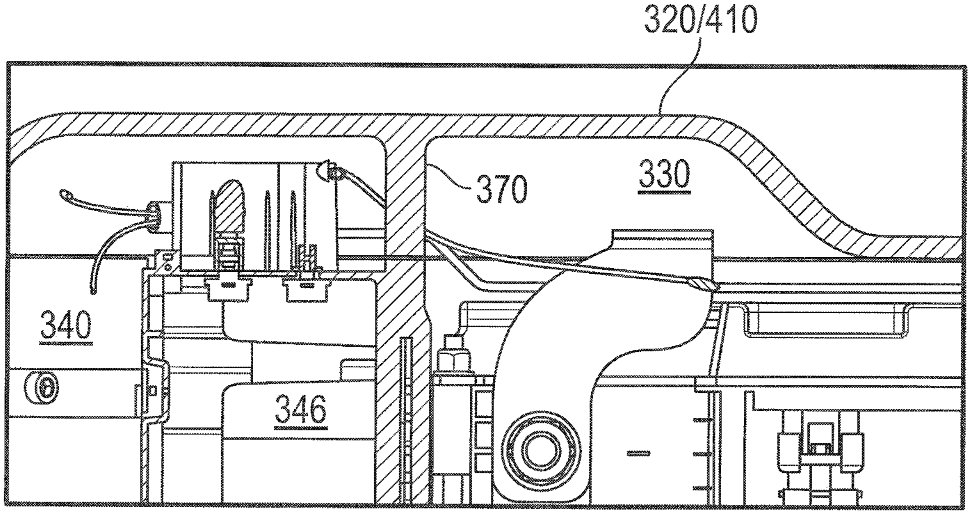

FIGS. 4A and 4B show various cross-sectional views of the battery box 110 with the lid 320 and the top plate 160 attached in accordance with certain embodiments. In some embodiments, the combination of the battery box base 310, the lid 320, and top plate 160 operate like a clamshell (see, e.g., FIG. 3E). In some embodiments, the lid 320 and/or the top plate 160 are constructed and arranged to protect the top of the battery box 110, e.g., if something were to fall between (or under) the cargo bed of the vehicle when the cargo bed is tilted up.

In some embodiments, the set of fasteners 316 are constructed and arranged to attach the lid 320 to the battery box body 310. In some embodiments, the set of fasteners 316 are further constructed and arranged to extend through the top plate 160 so that the lid 320 is sandwiched between the top plate 160 and the battery box body 310, as shown in FIG. 3A. In some embodiments, the set of fasteners 316 are metallic (e.g., steel).

As best shown in FIG. 4B, in some embodiments, the lid 320 includes a raised portion 410 that bulges upward. In some embodiments, the raised portion 410 enables the battery box 110 to accommodate additional componentry when a size of the battery box 110 is restricted. For example, in some embodiments, the electric vehicle 100 positions the cargo bed 170 (FIG. 1G) and/or other parts of the vehicle low for compactness, for a low center of gravity, to occupy a relatively large space, combinations thereof, etc., thus restricting the size of the battery box 110. In some embodiments, the raised portion 410 is constructed and arranged to extend through the opening 164 of the top plate 160 (FIG. 1E).

As best shown in FIG. 4B, in some embodiments, the raised portion 410 of the lid 320 is constructed and arranged to accommodate a upper portion of BMS componentry (e.g., the BMS 346). In this manner, terminals of the BMS 346 are able to connect with other internal modules without complexity in bus bars and wiring. In some embodiments, the BMS 346 is constructed and arranged to provide control between the sets of battery modules 332 and outside world to allow proper voltage and current for vehicle operation. Accordingly, in some embodiments, placement of the BMS 346 near the sets of battery modules 332 within the battery box 110 is optimal, addresses ingress protection (IP) rating concerns, combinations thereof, etc.

It should be understood that the raised portion 410 may be omitted in certain embodiments. Moreover, the battery box 110 may take other shapes and geometries.

In some embodiments, the lid 320 and/or the second inner wall 370 (e.g., at the region that interfaces with the lid 320) defines a gap to allow for passage of a busbar and/or other connections extending between compartments of the battery box 110 (e.g., between the component cavity 340 and the battery cavities 330).

Battery Box Details (e.g., Interlock Device)

Figure 5A:
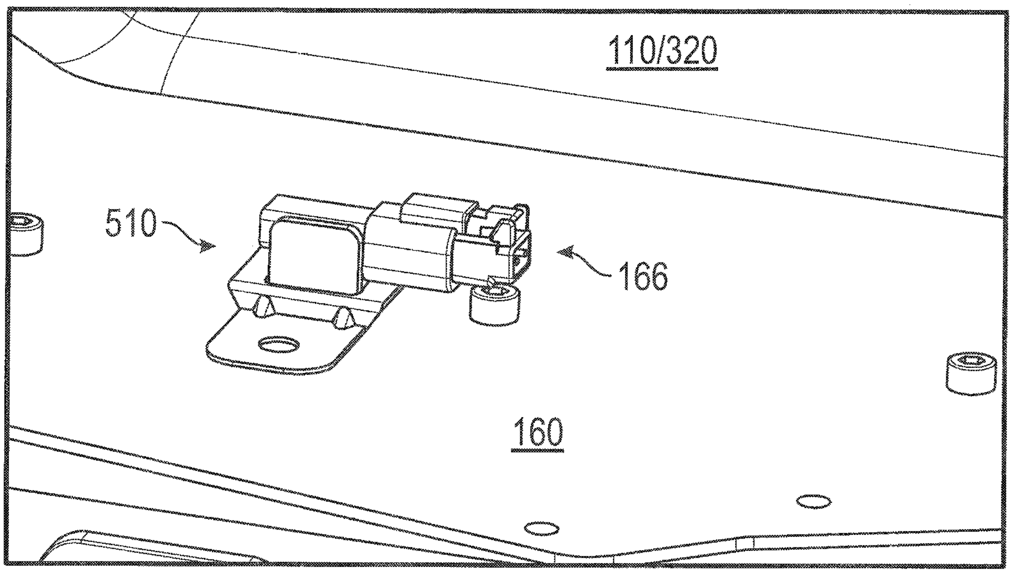
FIGS. 5A and 5C show particular details of an interlock device of the battery box in accordance with certain embodiments.
Figure 5B:
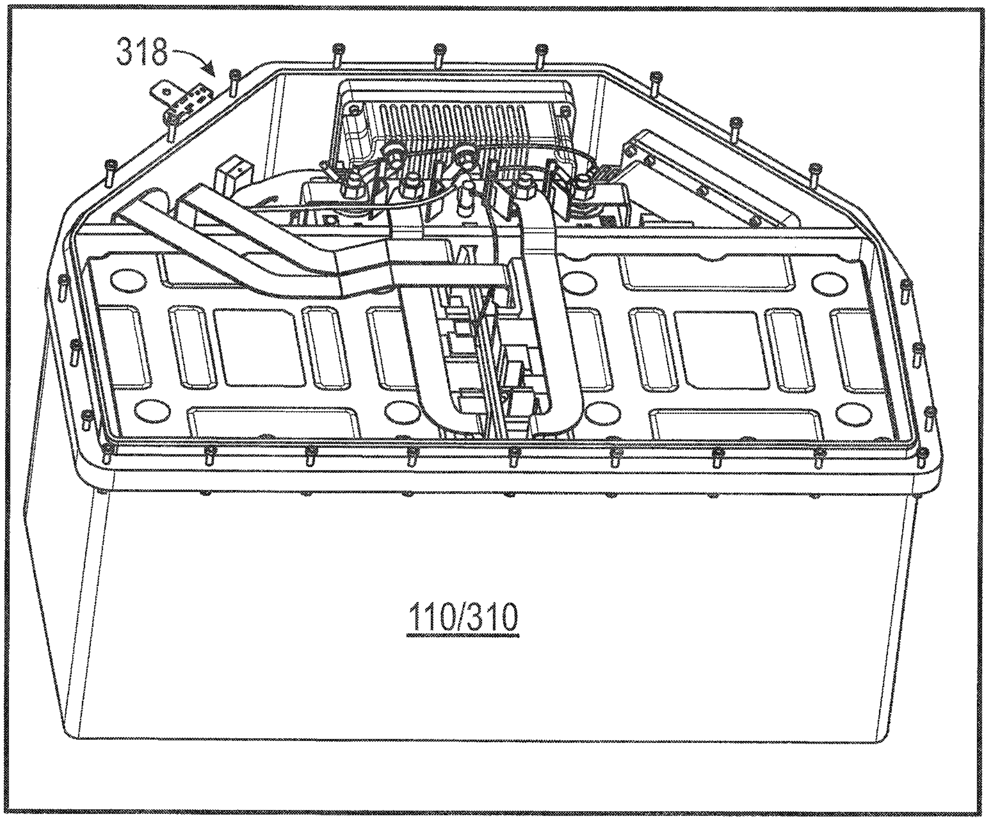
Figure 5C:
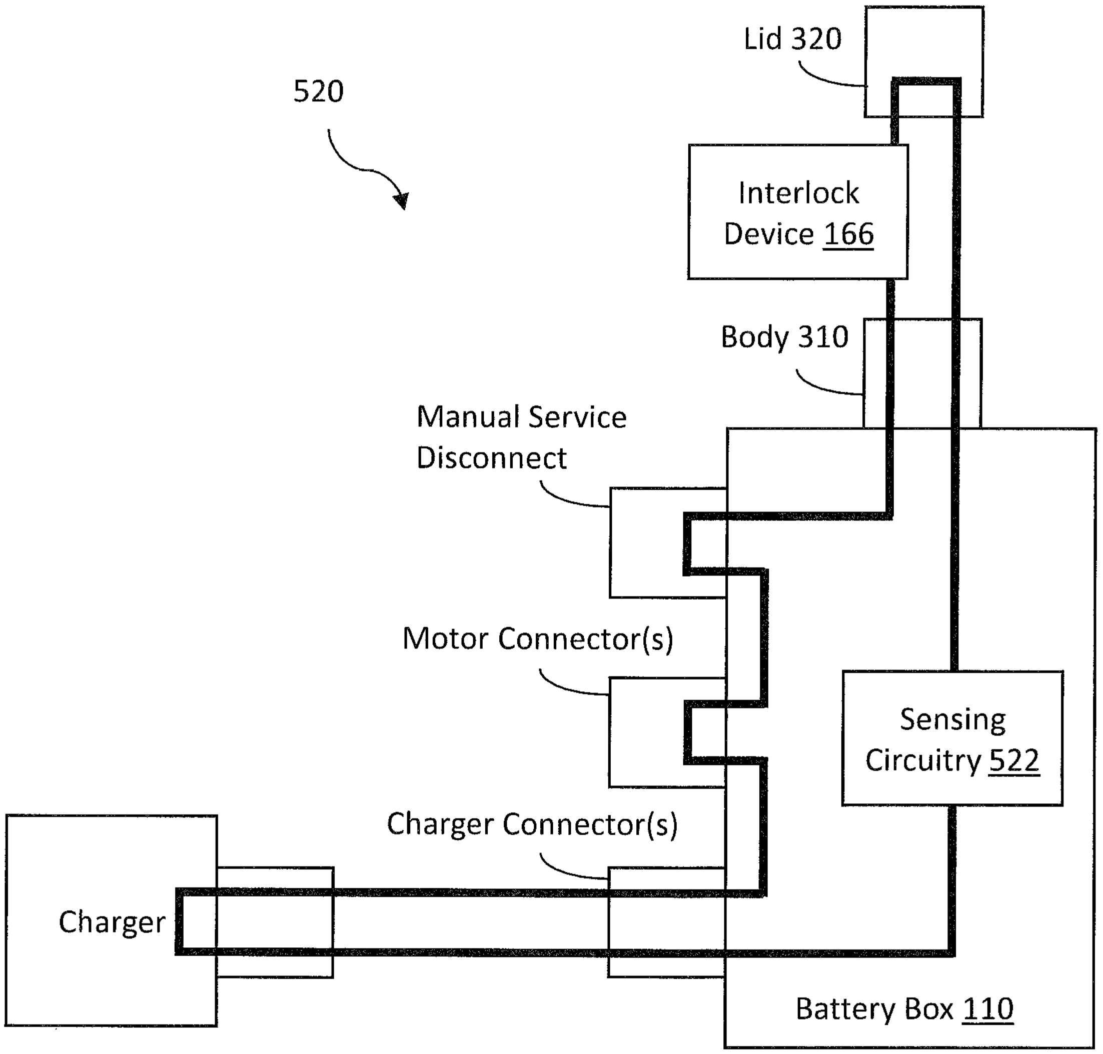

FIGS. 5A and 5C show particular details of the interlock device 166 (FIG. 1E) of the battery box 110 in accordance with certain embodiments. In some embodiments, the interlock device 166 is coupled with the battery box 110 and/or the top plate 160. In some embodiments, the interlock device 166 is constructed and arranged to act as a safeguard that disables certain electrical features when the interlock device 166 is removed (e.g., to then remove the top plate 160 and access the battery box 110). In some embodiments, removal of the interlock device 166 prevents anything connected to high voltage from being energized.

In some embodiments, the interlock device 166 is a high voltage interlock (HVIL) constructed and arranged to protect against inadvertent access to high voltage. In some embodiments, the interlock device 166 is attached to a connecting object 510 (e.g., a bolt, a connector, etc.) on the top plate 160 and/or the lid 320 of the battery box 110. In some embodiments, interlock device 166 is constructed and arranged to act as a service disconnect (or inductor) that current flows through during operation.

FIG. 5C shows an example interlock circuit 520 (or loop 520) which is suitable for protecting against unsafe battery box access. As shown, the interlock device 166 includes sensing circuitry 522 constructed and arranged to detect whether there is a break in the interlock circuit 520.

In some embodiments, the interlock device 166 constructed and arranged to be wired in-between (or connect) two separate sets of battery modules 332. In some embodiments, the interlock device 166 is constructed and arranged to split the separate sets of battery modules 332 into two <60-volt segments when the interlock device 166 is removed and the battery box 110 is opened. In these embodiments, it may be viewed that the threshold for high voltage is 60 v, so by doing this, the sets of battery modules 332 are separated into two circuits less than 60 v when opened, thus making the battery box 110 safer. Other thresholds and/or voltage levels are suitable for use as well.

During example operation, the interlock device 166 prevents a user from opening the lid 320 without breaking an interlock circuit 520. Along these lines, if a user attempts to remove the plate and removes the interlock, a break in the interlock circuit 520 causes the battery box circuitry to shut down (e.g., the battery box 110 transitions to a safe state). Accordingly, in some embodiments, the user cannot take the lid 320 off and access the batteries in a high voltage configuration. In this manner, the interlock device 166 protects users (human operators) from accidentally working with high voltage.

Along these lines, the sensing circuitry 522 detects whether there is a break in the interlock circuit 520. If not, the componentry within the battery box 110 remains in a high voltage configuration (or state) in order to deliver electric power for propulsion. However, if the interlock circuit 520 is broken, the componentry within the battery box 110 transitions to a safe configuration, e.g., a lower voltage configuration or a disabled state, to prevent injury. Accordingly, if the interlock device 166 is removed or if there is otherwise a break in the interlock circuit 520, the interlock device 166 places the circuitry within the battery box 110 in a safe state.

Battery Box Details (e.g., Heat Management)

Figure 6A:
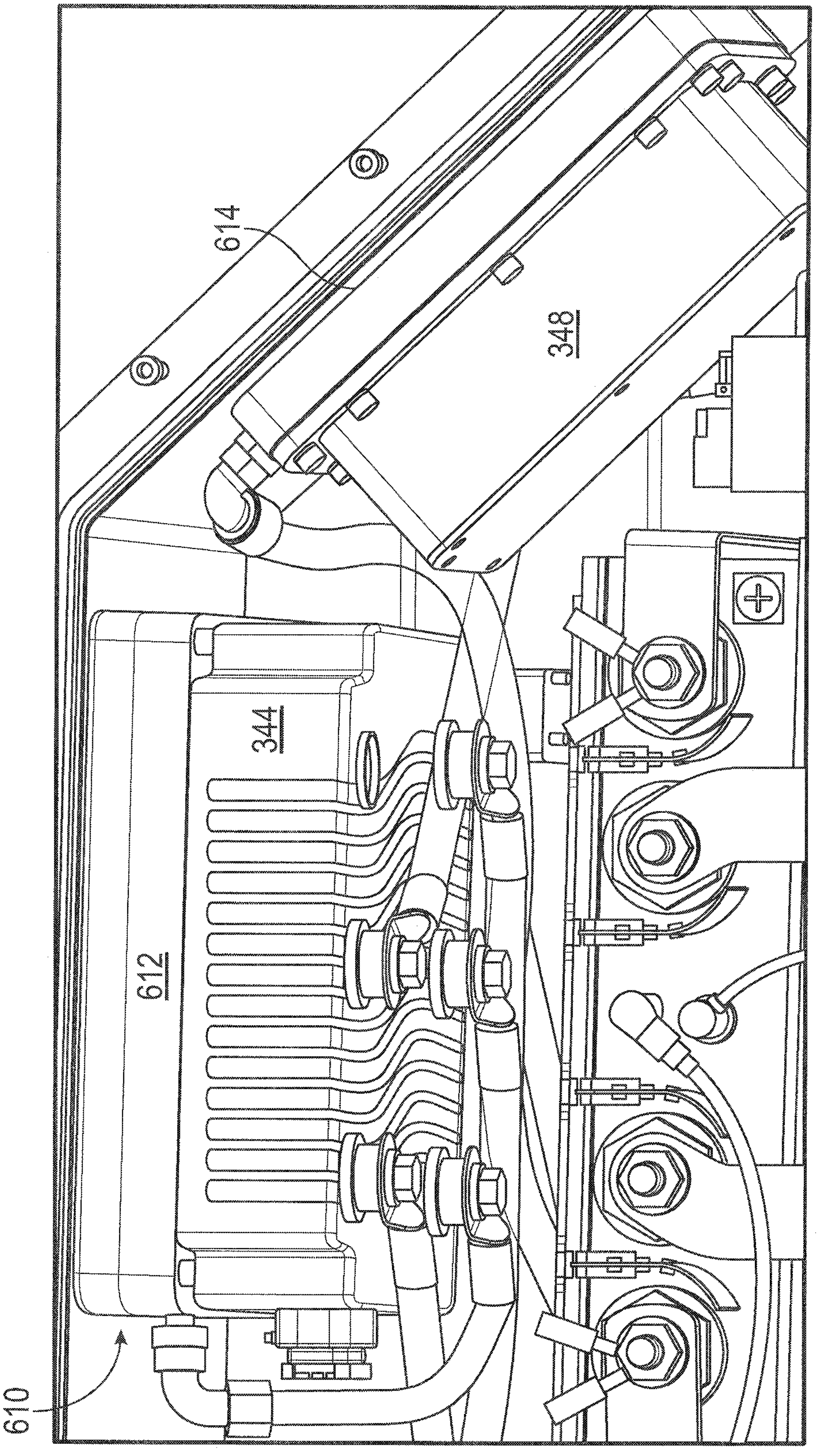
FIGS. 6A through 6C show heat management componentry of the battery box 110 in accordance with certain embodiments.
Figure 6B:
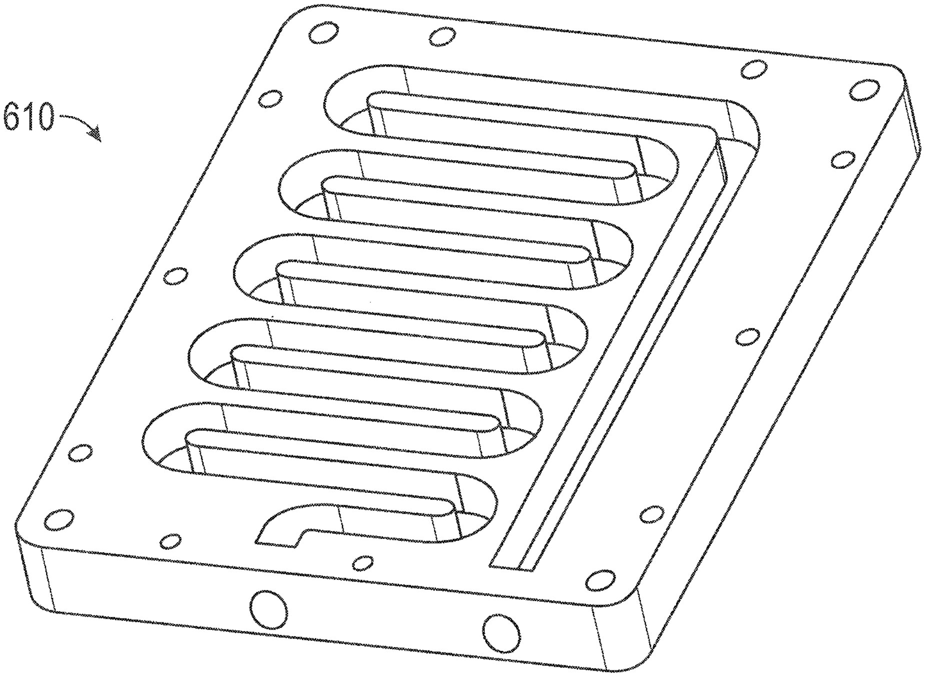
Figure 6C:
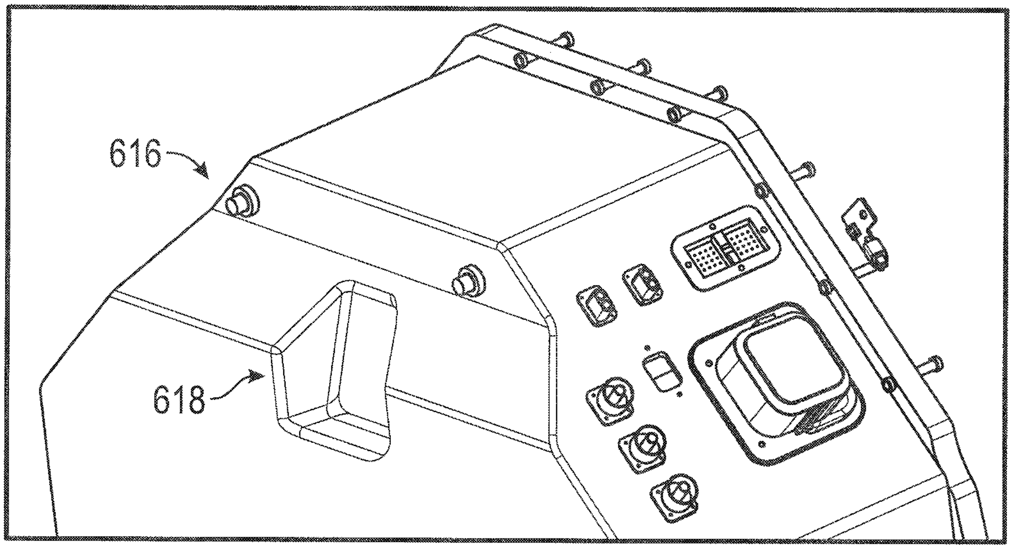

FIGS. 6A through 6C show heat management componentry 610 of the battery box 110 in accordance with certain embodiments. In some embodiments, the heat management componentry 610 is constructed and arranged to run heat management fluid (e.g., liquid cooling) into and out of various components, e.g., the battery box 110, a set of metallic plates that serve as heat sinks, a set of thermocouples, combinations thereof, etc. to improve heat transfer (e.g., from the DC/DC converter 348, from the motor controller 344, etc.). In some embodiments, the components are water cooled. However, other fluids are suitable as well (e.g., air, coolant, etc.).

Along these lines, as best shown in FIG. 6A, heat exchange plates 612, 614 are coupled with the set of electrical components 342 (e.g., the motor controller 344 and the DC/DC converter 348). In some embodiments, the component cavity 340 further includes a fluid pump for heat management, e.g., if such a pump is not available externally.

In some arrangements, the heat management componentry 610 is constructed and arranged to heat the sets of battery modules 332 (in the battery cavities 330) using heat from other components (e.g., the set of electrical components 342 in the component cavity 340). Other heat management configurations are suitable as well.

In some embodiments, the electric vehicle 100 has control features (e.g., vents, valves, etc.) that provide an ability to open or close and thus direct the heat to different locations, such as the sets of battery modules 332, outside, inside a vehicle cab, combinations thereof, etc. Along these lines, in some embodiments, the vehicle is equipped with the ducting 190 (e.g., molded features) (FIGS. 1E and 1F) for heat management. In some embodiments, such ducting enables fluid and/or air flow to be redirected. For example, in some embodiments, the ducting 190 includes airflow ducting constructed and arranged to exhaust heat directly into a front cab of the electric vehicle 100 for passenger use.

In an example heat exchange operation, water (or some other heat transfer fluid) flows into the battery box 110 for heat exchange and out. In some embodiments, electrical components (e.g., the motor controller 344 and the DC/DC converter 348) provide heat during operation, and such heat is removed and used elsewhere in the electric vehicle 100 where needed/desired. In some embodiments, heat captured from within the battery box 110 is used to heat occupants and/or other vehicle components.

It should be appreciated that, in conventional vehicles, electric components may be normally air cooled and left exposed (e.g., simply mounted to a vehicle chassis or body panel). However, in accordance with certain embodiments, these same components are used within the battery box 110. Additionally or alternatively, in some embodiments, the battery box 110 houses certain components over components with higher ingress protection (IP) ratings (or similar ratings for industrial enclosures). That is, such components do not need to be upgraded, etc. Rather, the components are used within the battery box 110 and water cooled thus enabling the components to run properly within an enclosed environment without overheating. Moreover, using a water heat exchanger enables the heat to warm the sets of battery modules 332 and/or other components in cold settings.

FIG. 6C shows a bottom view of the battery box 110 in accordance with certain embodiments. As shown, various fittings 616 are constructed and arranged to connect the battery box 110 to other parts of the electric vehicle 100 (e.g., a heat exchange pump, etc.). In some embodiments, the battery box 110 uses A-N fitting for one or more connections. Other lines may connect via snap-on fittings, threaded fittings, and so on.

As best shown in FIG. 6C, in some embodiments, a backmost section of the battery box 110 (e.g., a section of the component cavity 340) has a raised bottom portion 618 to accommodate the rear differential 214 (or other vehicle componentry). However, it should be understood that the raised bottom portion 618 may be omitted in certain embodiments. Moreover, the battery box 110 may take other shapes, orientations, and geometries.

Battery Box Details (e.g., Body)

FIGS. 7A through 7E show particular details of the battery box 110 in accordance with certain embodiments. In some embodiments, the body 310 (or "hull") of the battery box 110 is formed by multiple layers to form a rigid, insulating container.

Figure 7A:
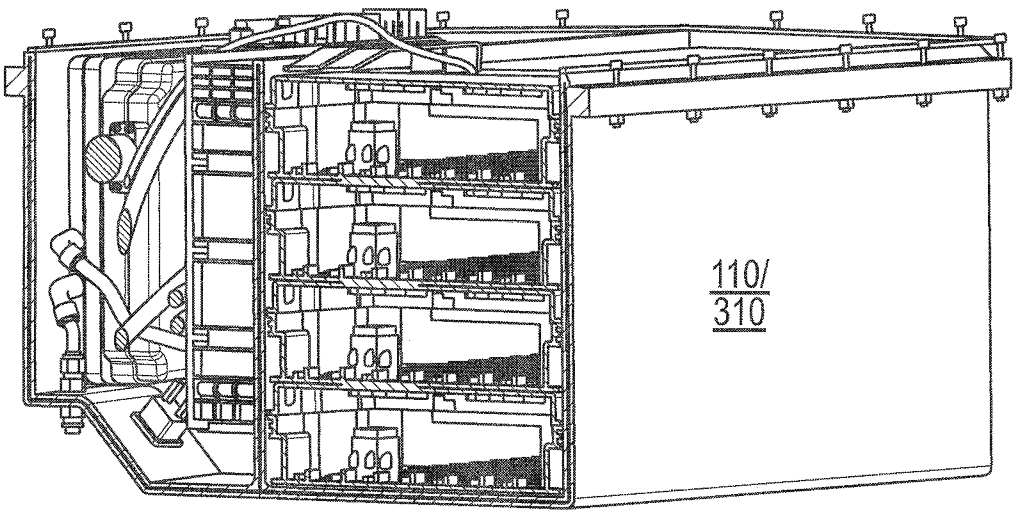
FIGS. 7A through 7E show particular details of the battery box in accordance with certain embodiments.
Figure 7B:
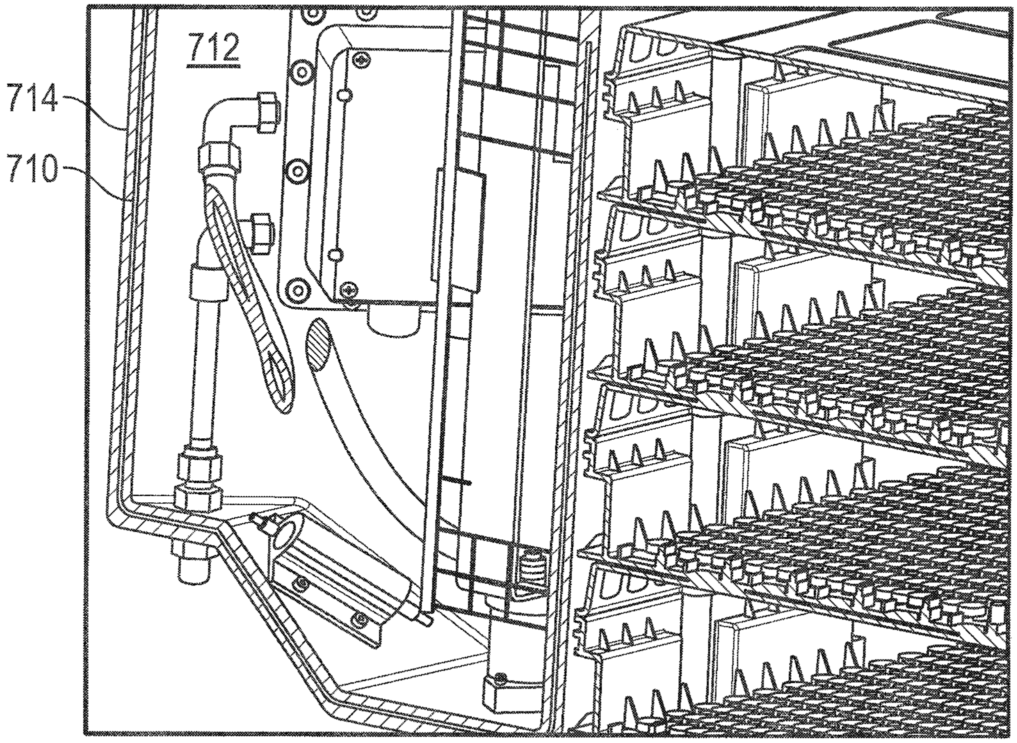

As best shown in FIG. 7B, in some embodiments, the battery box body 310 includes a metallic (e.g., steel) skeleton 710, an inner insulating layer 720 that faces an interior of the battery box 110 and an outer insulating layer 730 that faces outwardly. In some embodiments, the metallic skeleton 710 provides sufficient structural support for the components so that no additional support members are needed on a chassis of the electric vehicle 100 (e.g., the battery box 110 is a self-supporting structure).

In some embodiments, the metallic skeleton 710 enables extension of the chassis ground to the battery box components. For example, in some embodiments, the set of fasteners 316 (FIG. 3C) are constructed and arranged to couple with the metallic skeleton 710 and the top plate 160 (FIG. 1E). Further, in some embodiments, the top plate 160 is further coupled with the vehicle frame 130. In some embodiments, the set of fasteners 316 and the top plate 160 are metallic (e.g., steel). Accordingly, the top plate 160 and the set of fasteners 316 connect the metallic skeleton 710 to chassis ground of the electric vehicle 100.

In some embodiments, mounting holes penetrate one or both of the insulating layers 720, 730 to engage threaded hardware of the metallic skeleton 710. Accordingly, when the battery box 110 is fastened to the vehicle frame 130, the metallic skeleton 710 connects to the chassis ground of the electric vehicle 100. In some embodiments, the body 310 is provisioned with a designated ground post for connection with the vehicle frame 130.

In some embodiments, the battery box body 310 uses reinforced plastic molded over perforated metal. In some embodiments, a polymeric coating provides heat/electrical isolation between the two compartments, and protects against the exterior environment (e.g., dust, water, etc.). In some embodiments, the utilization of plastic makes the body 310 watertight and temperature insulating and protects the sets of battery modules 312 from shorting out internally. That is, the body 310 provides water tightness and insulation from outside and inside. In some embodiments, the polymeric coating is nylon and/or ABS with fiber reinforcement. In some embodiments, carbon fiber, fiberglass, etc. is also used, e.g., to provide structural support to the body 310.

In some embodiments, features are molded into the battery box 110. For example, in some embodiments, at least a portion of the bottom (or floor) of the battery box 110 has a side facing the interior that mirrors one or more battery modules to facilitate battery module stacking. For example, in some embodiments, a bottom of the battery box 110 (e.g., a floor of the insulative inner layer 720) is provided with mounting features that are shaped like the top of a battery module so that the battery stacks are easily fixed in place.

In some embodiments, the battery box 110 is constructed and arranged to eliminate or minimize redundant brackets. That is, in some embodiments, the battery box 110 supports retrofitting with different brackets to replace or upgrade components such as the converter, etc. In such embodiments, the inner portion of the bottom and/or sides are less customized for simplicity, other uses, repurposing, and so on.

In some embodiments, the body 310 provides a bolt pattern to match that of the vehicle frame 130. This enables the bottom of the battery box 110 to richly and reliably mount to the subframe.

In an example manufacturing operation, the battery box 110 starts with the metallic skeleton 710 which is then covered (or encased) by the inner insulating layer 720 and the outer insulating layer 730.

Figure 7C:
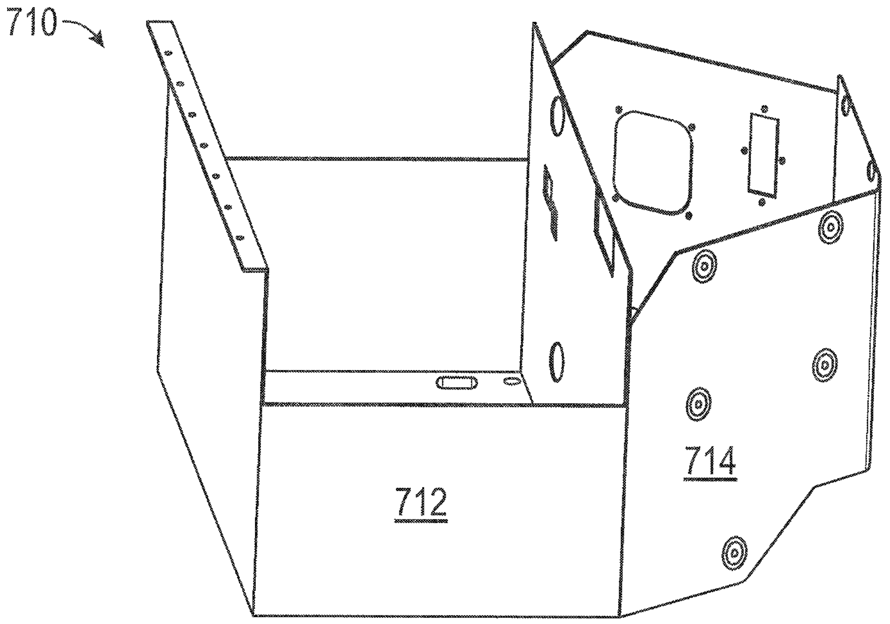
Figure 7D:
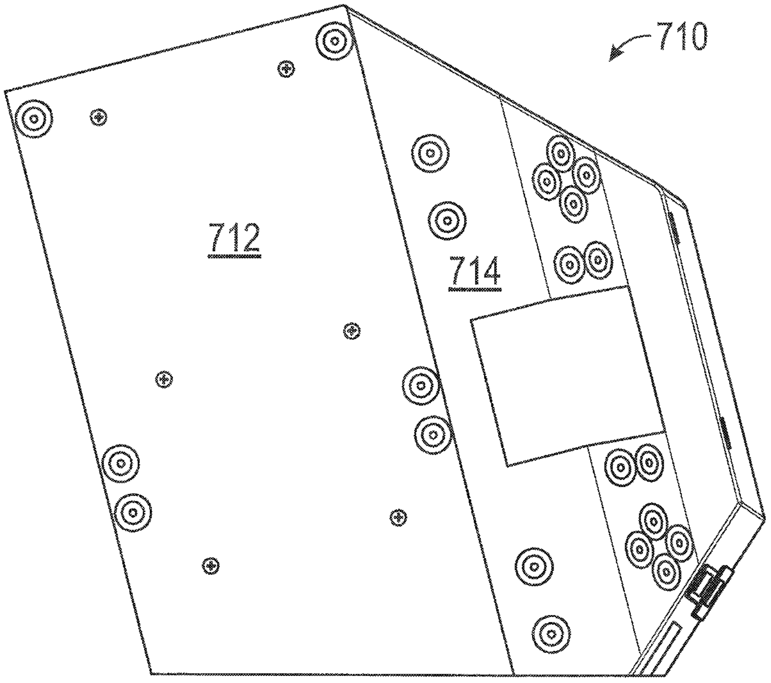
Figure 7E:
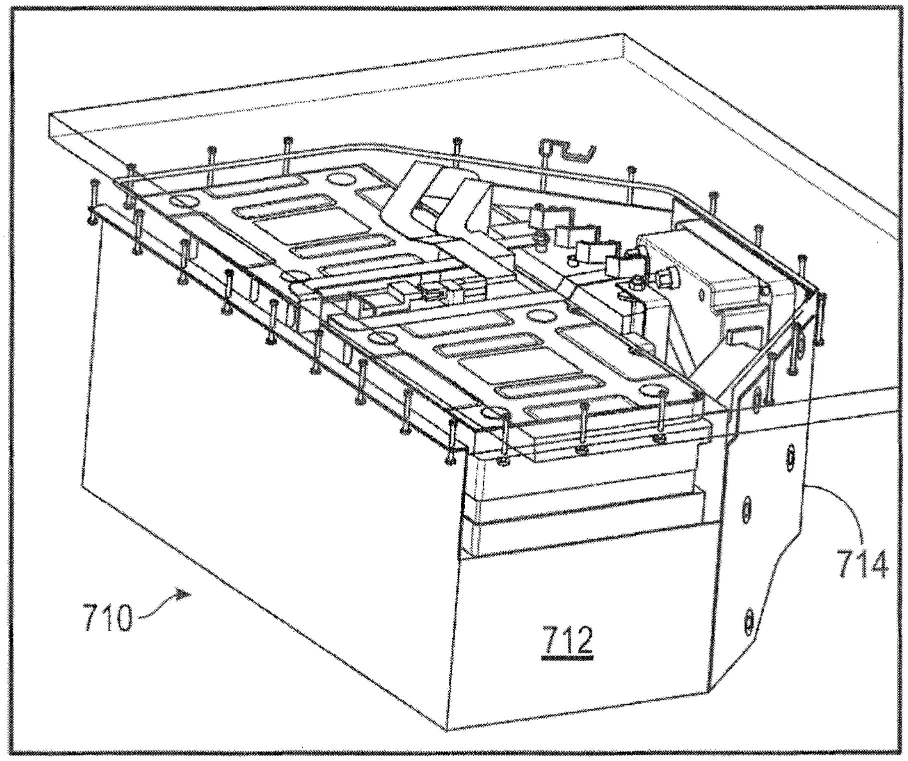

In some embodiments, the battery box 110 itself is first formed by stamping/shaping the metallic skeleton 710. As shown in FIG. 7C, a battery portion 712 of the metallic skeleton 710 is welded or otherwise joined to a component portion 714 (e.g., a portion constructed and arranged to house the motor controller 344, the BMS 346, and the DC/DC converter 348, etc.). Although shown as solid sheets, in some embodiments, the metallic skeleton 710 comprises a mesh or perforated metal that allows for infusion/interlocking of a polymeric material (ABS, nylon, etc.) to be over-molded onto the skeleton.

In some embodiments, the first inner wall 360 and the second inner wall 370 (FIG. 3E) are provided during the molding process. In some embodiments, the first inner wall 360 is formed without metal reinforcement. In some embodiments, the second inner wall 370 is formed over a portion of the metallic skeleton 710. In some embodiments, the first inner wall 360 extends from the second inner wall 370 to a front wall of the battery box 110. Thus, when the sets of battery modules 332 are inserted, the first inner wall 360 physically separates the sets of battery modules 332 from each other to provide electrical and heat isolation of the two along the sides thereof. In some embodiments, the first inner wall 360 does not extend up to the lid 320 (FIG. 3A), so that airflow can travel across it to allow for the temperature to be balanced in the battery cavities 330.

Other processes may be used to form the battery box body 310. Along these lines, in accordance with other embodiments, the battery box body 310 is an injection molded structure with metal inserts. For example, in some embodiments, metal connectors are welded to the metallic skeleton 710, and then cast in plastic. Next, metal brackets are added to the inside of interior battery box space to hang components. Then, the supports and additional hardware are installed before installing the components.

In some embodiments, after the components are installed, the battery box 110 is provided as a subassembly to an assembly line. Along these lines, in some embodiments, the battery box 110 is dropped in from above the vehicle frame 130 so that it rests on the cradle structure 150 positioned at the bottom of the vehicle frame 130 (FIG. 1D). The lid 320 of the battery box 110 is secured to the upper portion 132 of the vehicle frame 130 using the top plate 160. In some embodiments, the top plate 160 maintains a gap between the battery box itself and the upper frame members for example, to avoid contact during high deflection events (acceleration, rough terrain, etc.). In some embodiments, the electric motor 120 and any other electrical components are then simply plugged into the ports on the exterior of the battery box 110. Locating the controllers/BMS/converters in a rear portion of the battery box 110 away from the seats allows for easy accessibility when connecting/disconnecting components to the battery box 110.

It should be understood that variations may be made without departing from the spirit and scope of the present disclosure. For example, in some embodiments, the battery box 110 is loaded on the vehicle frame 130 from a side of the vehicle frame 130 or lifted from below the vehicle frame 130.

Battery Box Details (e.g., Interfaces)

Figure 8A:
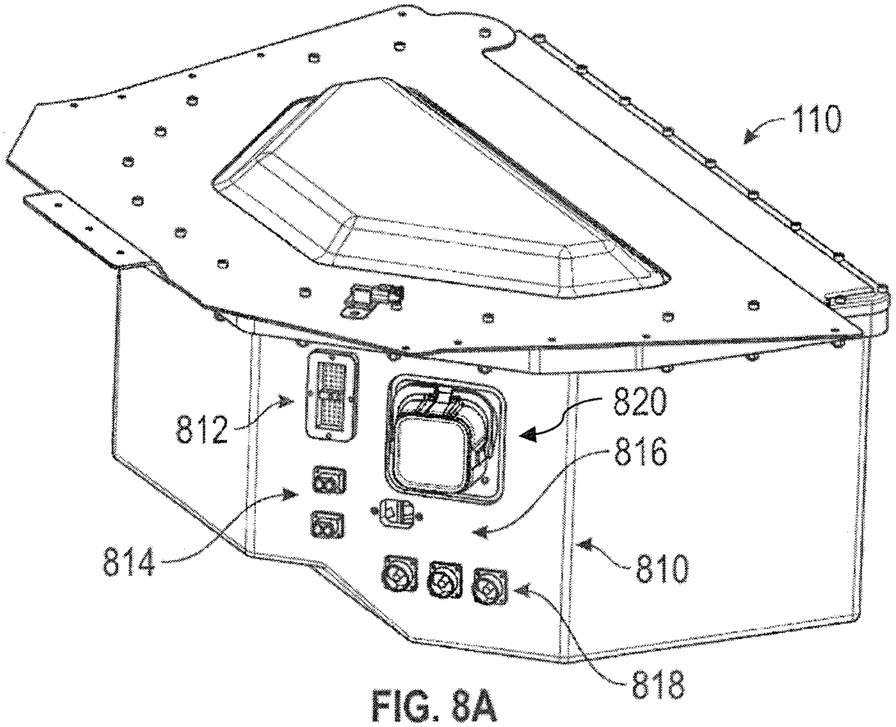
FIGS. 8A through 8C show an example interface section of the battery box in accordance with certain embodiments.
Figure 8B:
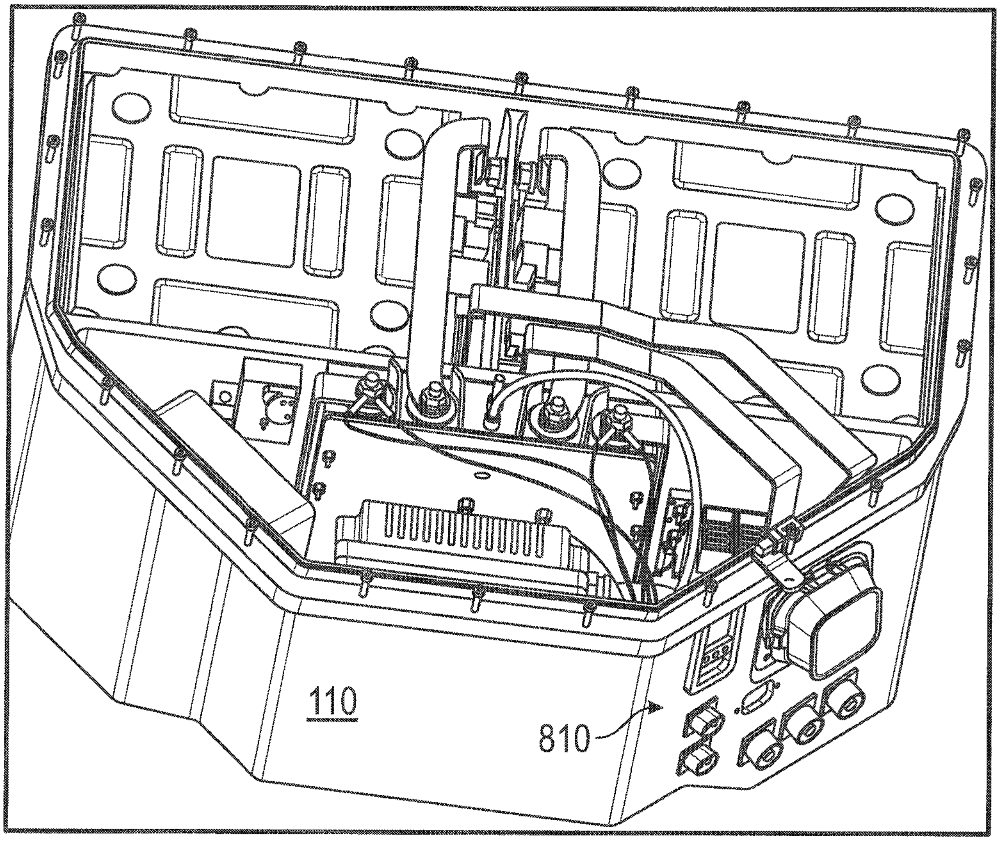
Figure 8C:
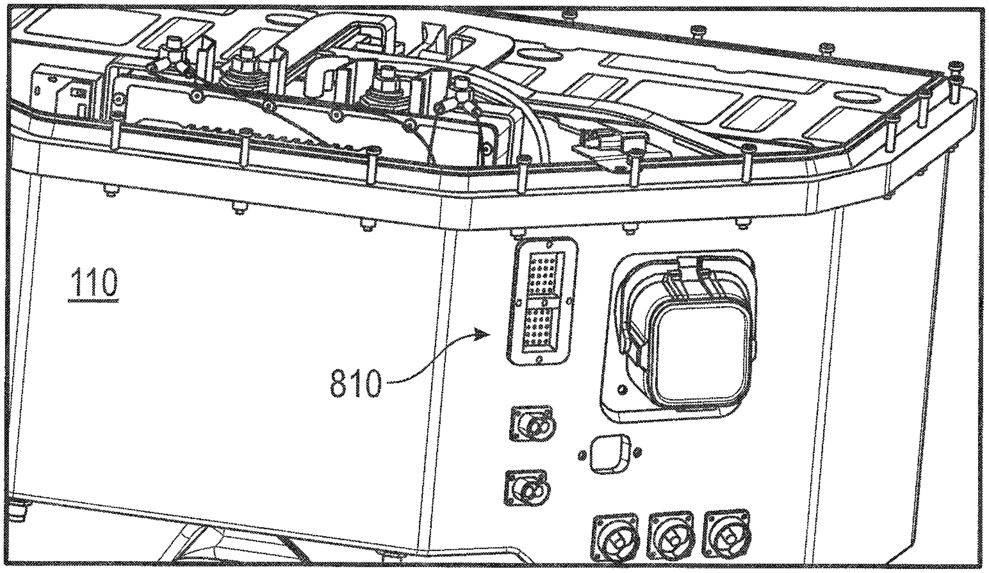

FIGS. 8A through 8C show an example interface section 810 of the battery box 110 in accordance with certain embodiments. In some embodiments, the interface section 810 is disposed on a side of the battery box 110. In some embodiments, the interface section 810 is located in an area away from interference with the seating area 140 of the electric vehicle 100 so that cabling, tubing, etc. connecting to the interface section 810 may be easily accessed. For example, as shown, the interface section 810 is provided on a rearward side of the battery box 110.

In some embodiments, the interface section 810 includes a set of electrical connection ports that provide access to the internally disposed circuitry in low voltage state (see, e.g., FIG. 8C). In some embodiments, the set of electrical connector ports include a set of low voltage data connector ports 812 (e.g., to receive and/or send I/O signals to control operation of the electric vehicle 100), a set of charger ports 814 (e.g., to connect high voltage lines for chargers constructed and arranged to provide power to the sets of battery modules 332), a set of DC/DC converter ports 816, and a set of motor controller ports 818 (e.g., to control the electric motor 120).

In some embodiments, the interface section 810 further includes a manual service disconnect (MSD) 820 that plugs into a connection panel of the interface section 810. In some embodiments, the MSD 820 enables a user to break the interlock circuit 510 (FIG. 5C), e.g., to place components within the battery box 110 in a low voltage configuration.

In some embodiments, one or more connectors include an interlock to sense when connections (e.g., to cables) are present. In some embodiments, while the battery box 110 is fully assembled, the sets of battery modules 332 connect to provide a high voltage output. In some embodiments, the interface section 810 (e.g., connections adjacent to the manual service disconnect 820) provides CAN bus access (e.g., for control/status/etc.), charging access, 12V access, and 3-phase power to the electric motor 120.

It should be understood that the connector ports are provided for example purposes, and in some embodiments, more or fewer connector ports are provided.

Further Details

While various embodiments of the present disclosure have been particularly shown and described, it will be understood by those skilled in the art that various changes in form and details may be made therein without departing from the spirit and scope of the present disclosure as defined by the appended claims.

For example, FIGS. 9A through 9D show an example electric vehicle 900 with an alternative battery box 910 in accordance with certain embodiments. In some embodiments, the electric vehicle 900 includes one or more ground-engaging members 902 (e.g., four tires), operator controls 904, and other components constructed and arranged to richly and robustly support operation of the electric vehicle 900. In some embodiments, the battery box 910 is constructed and arranged to provide electric power to an electric motor 920 for vehicle propulsion. In some embodiments, the electric vehicle 900 is a side by side (SxS) or other 4-wheel recreational vehicle.

Certain portions of the electric vehicle 900 (e.g., exterior panels, doors, a hood, a cargo bed, etc.) may have been omitted from these figures for simplicity and/or to better show other details of the electric vehicle 900.

In some embodiments, the electric vehicle 900 includes a vehicle frame 930 constructed and arranged to be used for traditional internal combustion engine and hybrid electric vehicle models.

In some embodiments, the battery box 910 is constructed and arranged to house a set of batteries and a set of electric components (e.g., a BMS and a motor controller) in a way that protects these components while still accommodating the positioning of drivetrain components such as a driveshaft 906 that are common on each model, thereby reducing cost.

In some embodiments, the battery box 910 is provided at least partially under seats 940. In some embodiments, the battery box 910 is constructed and arranged to house the batteries 912 and other components 914 (e.g., the BMS and the motor controller). In some embodiments, the battery box 910 is constructed and arranged to protect the components from the environment and is shaped to also accommodate other vehicle components such as the driveshaft that extends between a front differential 982 and a rear differential 984. Accordingly, the batteries 912 are maintained as low as possible (e.g., to have a low center of gravity) without interfering with other components of the electric vehicle 900, such as a driveshaft that is used on the other vehicle types, thereby allowing for the use of some common drivetrain components/configurations.

Figure 9A:
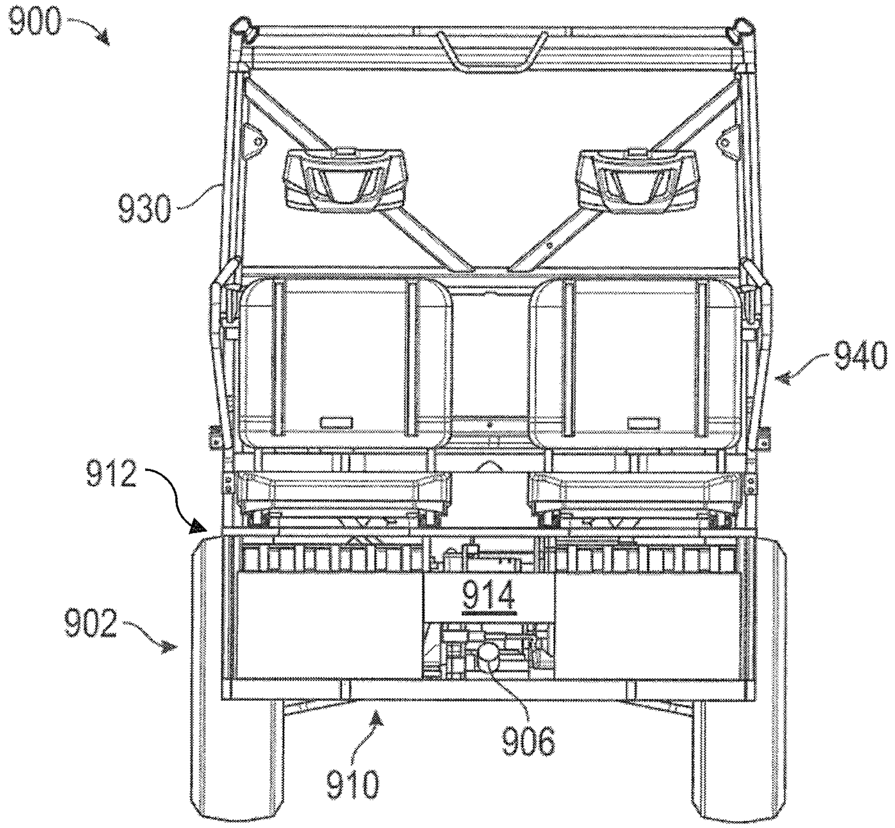
FIGS. 9A through 9D show an example electric vehicle with an alternative battery box in accordance with certain embodiments.
Figure 9B:
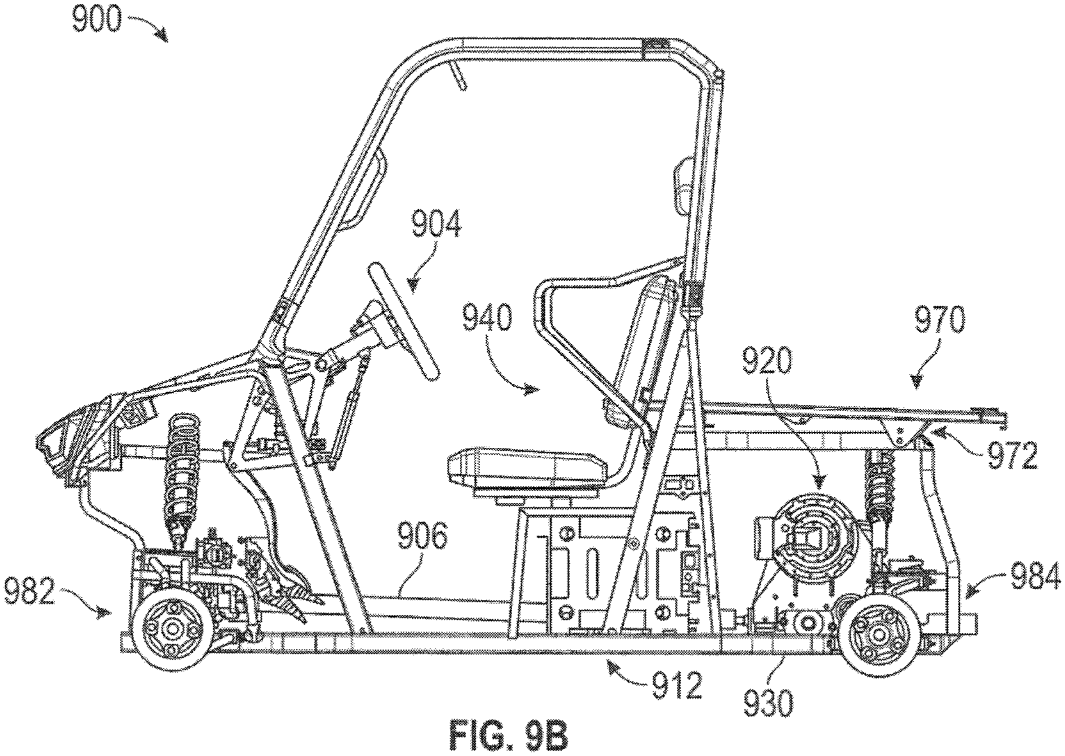

In some embodiments, the batteries 912 and the other components 914 (e.g., the BMS, the motor controller, and wiring) are housed within the battery box 910. As shown in FIG. 9A, although the battery box 910 is closed, it is shown open with no lid or top in the figure above so that the positions of certain components on the vehicle and in the box can be seen. In some arrangements, the bottom floor of the battery box 910 has a raised portion of a "hat" section 916 positioned between the batteries 912. In some embodiments, the hat section 916 is constructed and arranged to house the other components 914 (e.g., the BMS, motor controller, etc.) on the upper surface and allows the driveshaft 906 to pass underneath a lower surface of the hat section 914 to extend from the front differential 982 to the rear differential 984. As shown, a bottom of the battery box 910 on each side of the driveshaft 906 is positioned lower than the driveshaft 906, so that the driveshaft 906 is positioned between the batteries 912 as it passes through/under the battery box 910.

As shown, in some embodiments, the electric motor 920, the batteries 912, and/or the other components 914 are positioned partially under the seats 940 at a forward end. Further as shown, these components are positioned partially under a conventional cargo bed portion 970 at a rearward end. In some embodiments, the cargo bed portion 970 includes a pivot point 972 constructed and arranged to pivot upward to provide access to the batteries 912, the BMS, and/or the motor controller through an upper/rear portion of the vehicle frame 930.

Figure 9C:
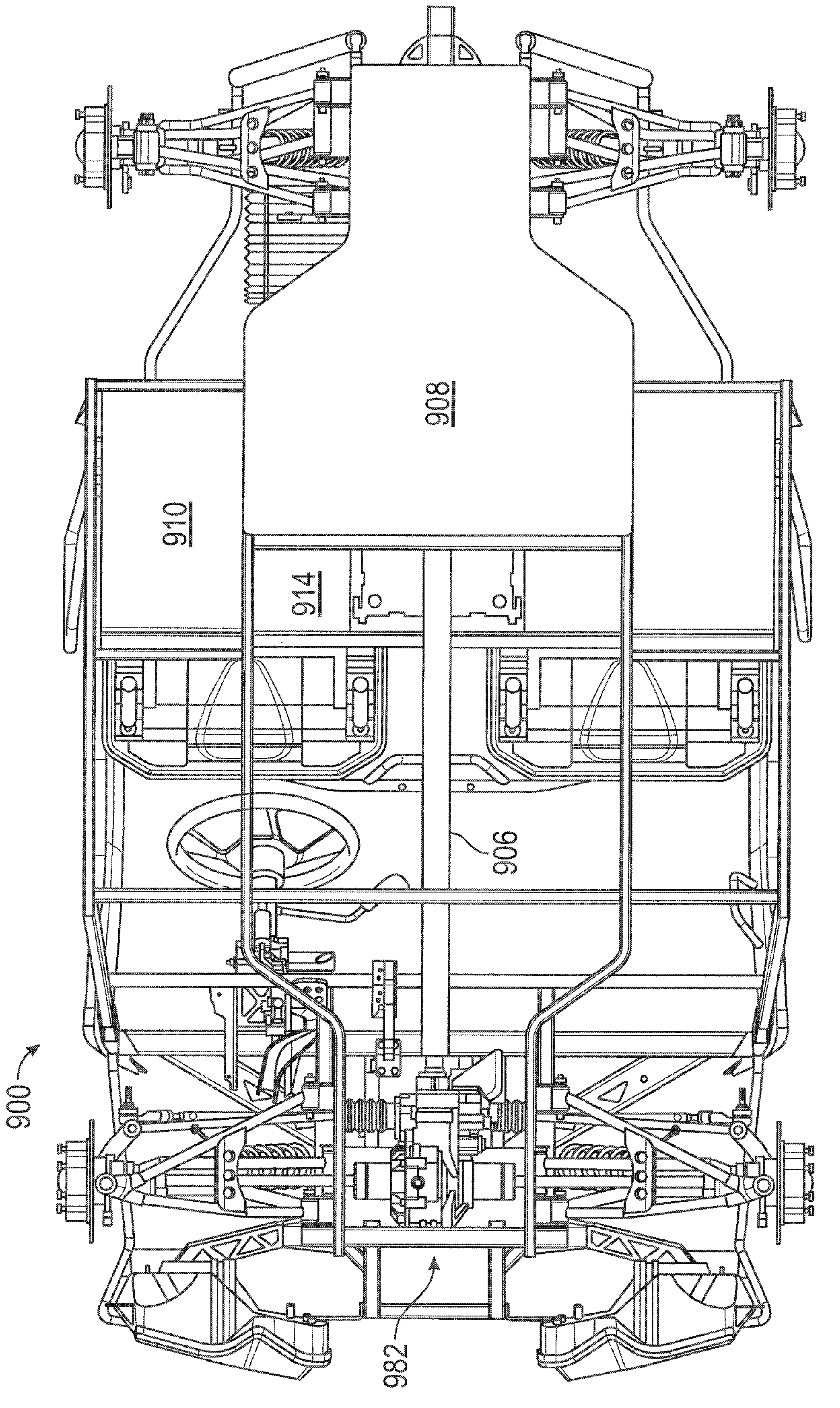

FIG. 9C shows a bottom view of a portion of the electric vehicle 900. As shown, the electric vehicle 900 includes a skidplate 908. In some embodiments, the skidplate 908 is constructed and arranged to protect the rear differential 982 from the external environment (e.g., mud, water, debris, etc). In some embodiments, the skidplate 908 provides protection for other components, e.g., a motor oil pan in an internal combustion model.

Figure 9D:
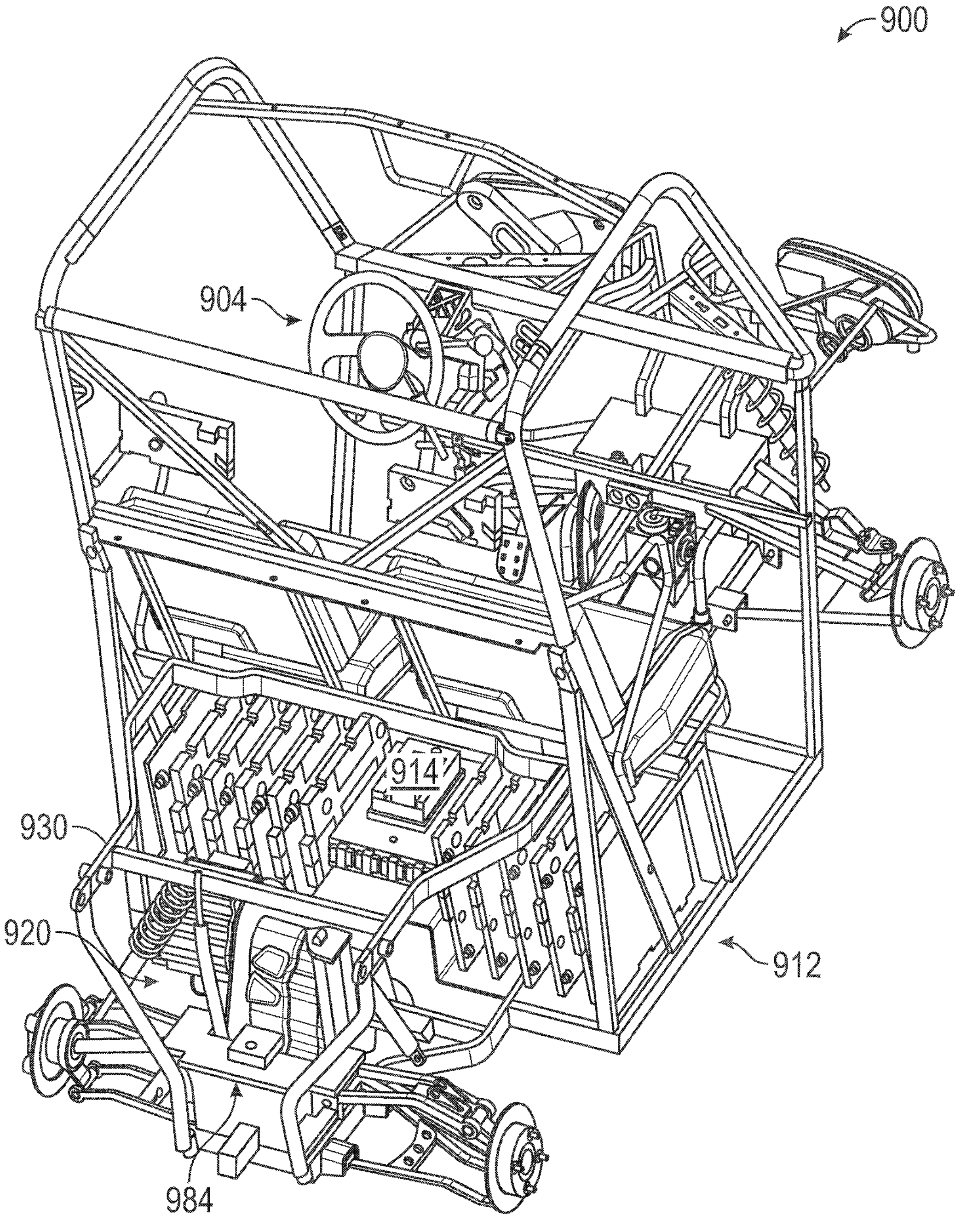
Figure 10A:
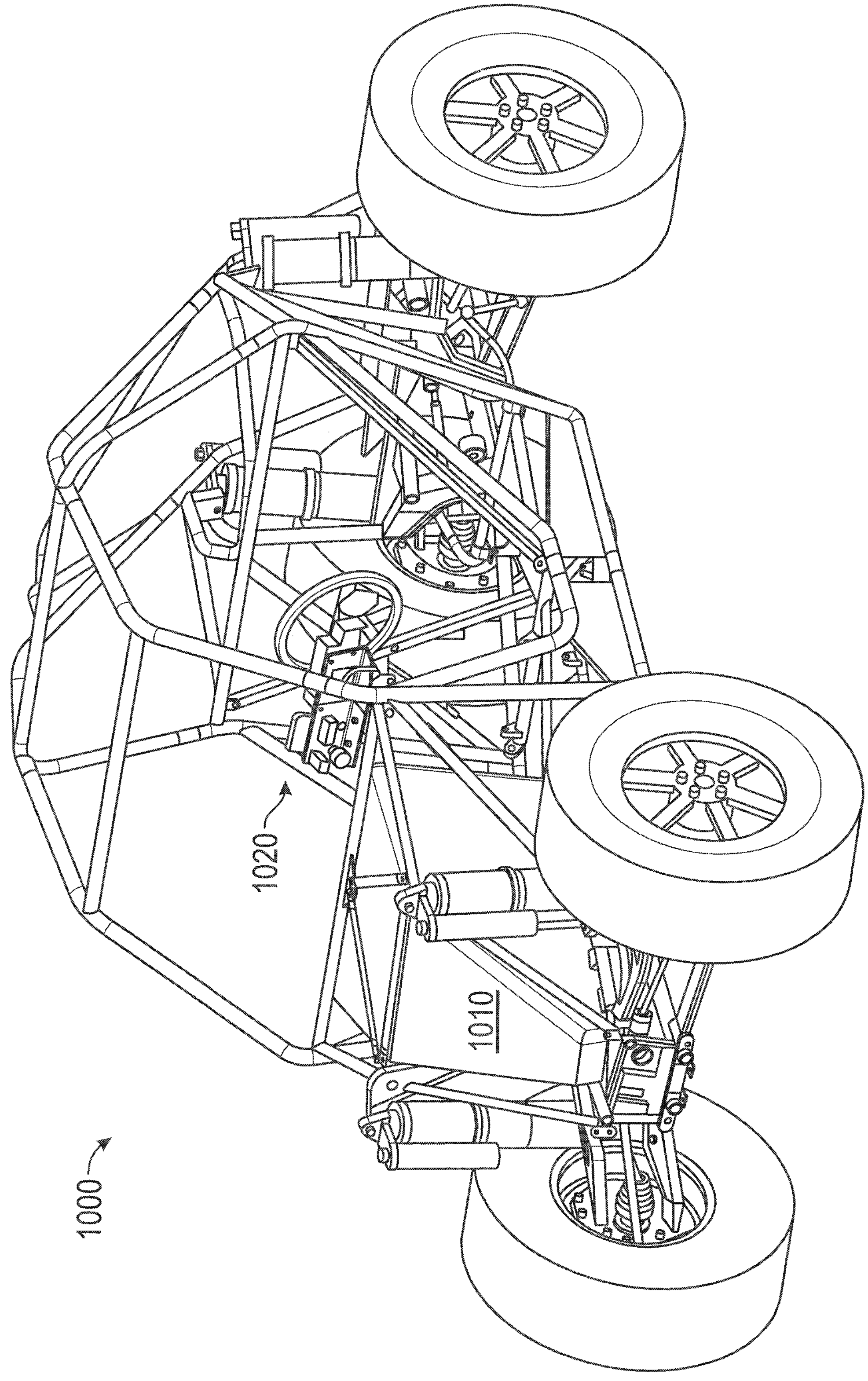
FIGS. 10A through 10F show an example electric vehicle with an alternative battery box in accordance with certain embodiments.
Figure 10B:
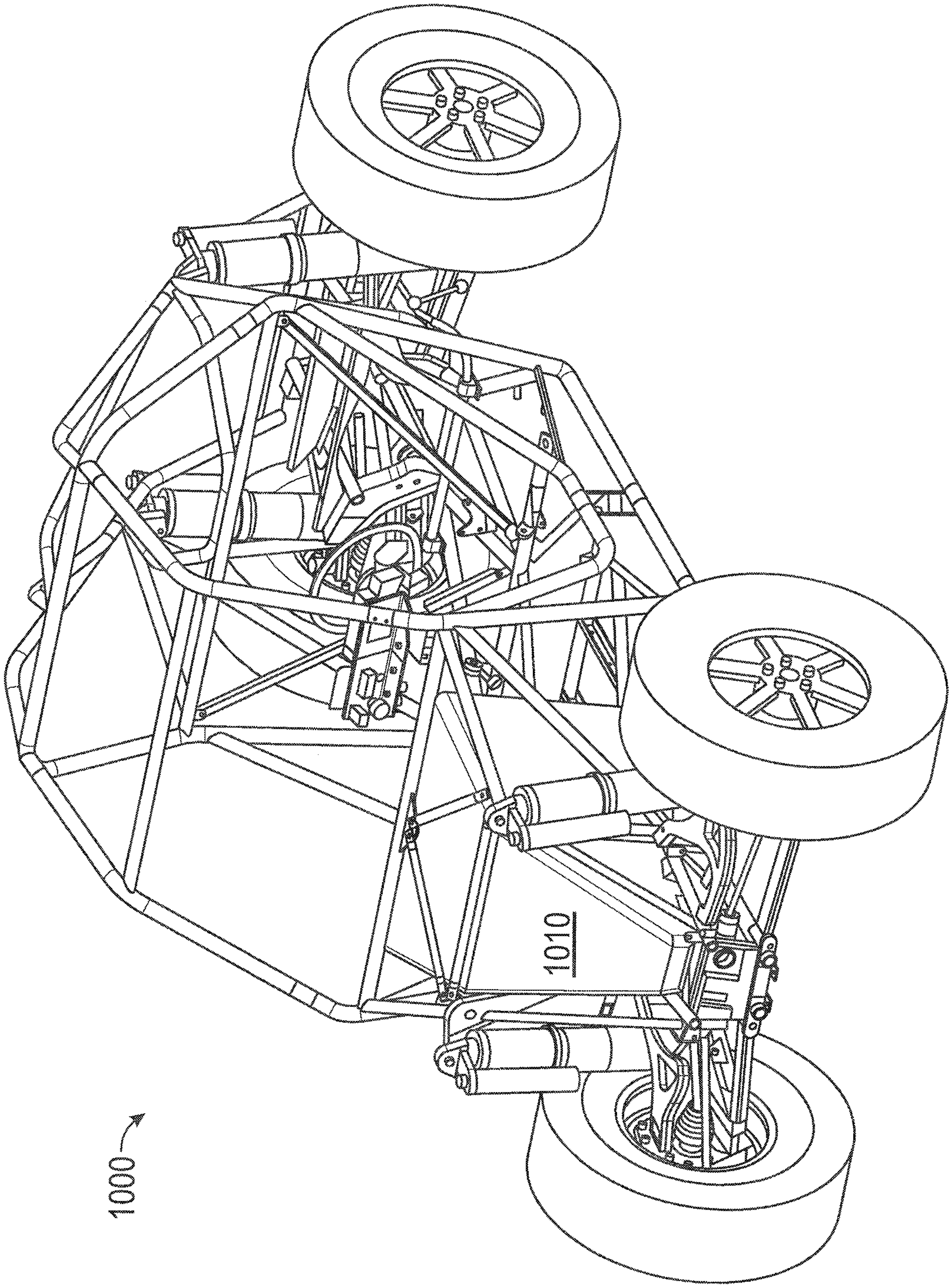
Figure 10C:
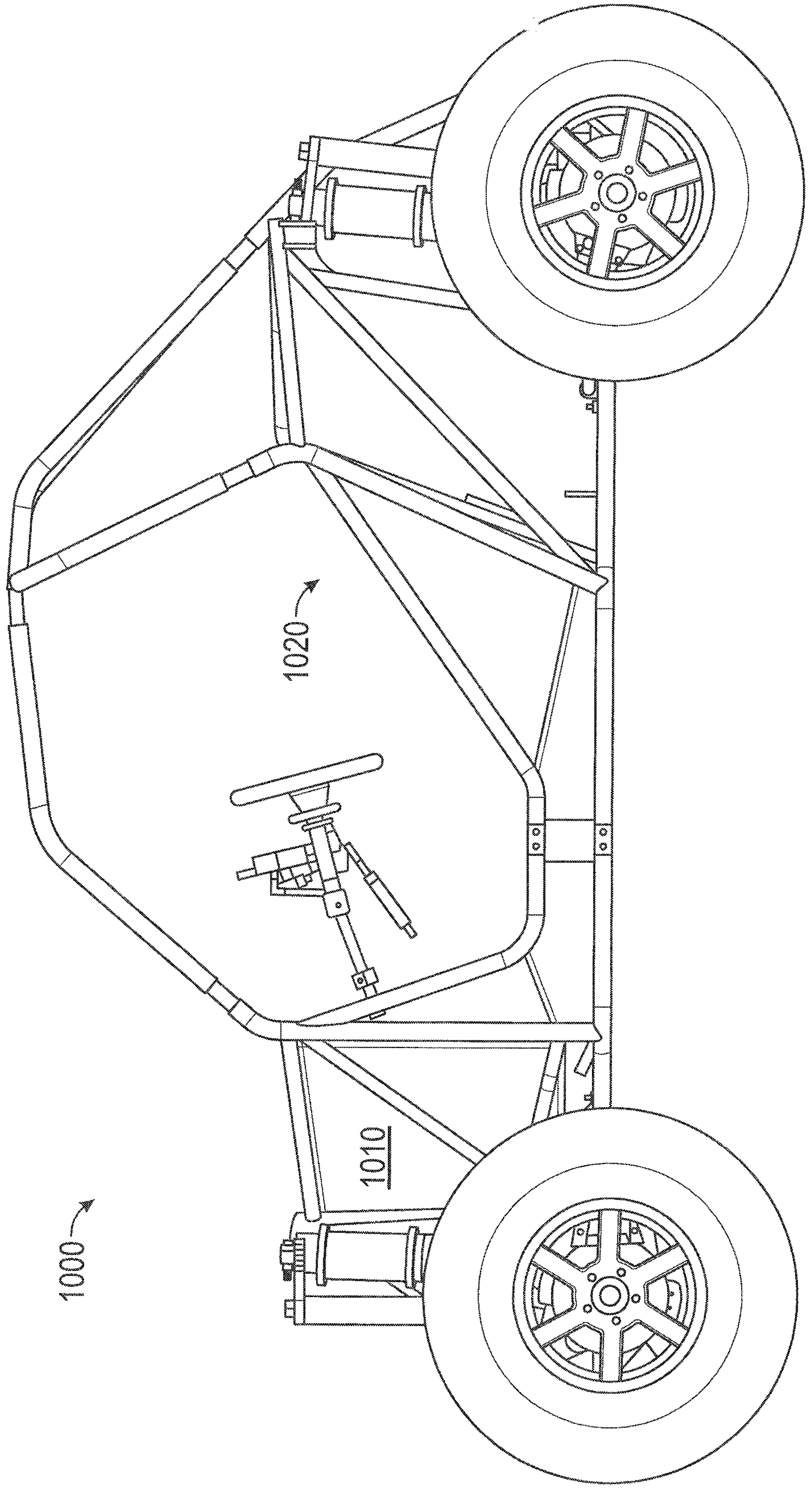
Figure 10D:
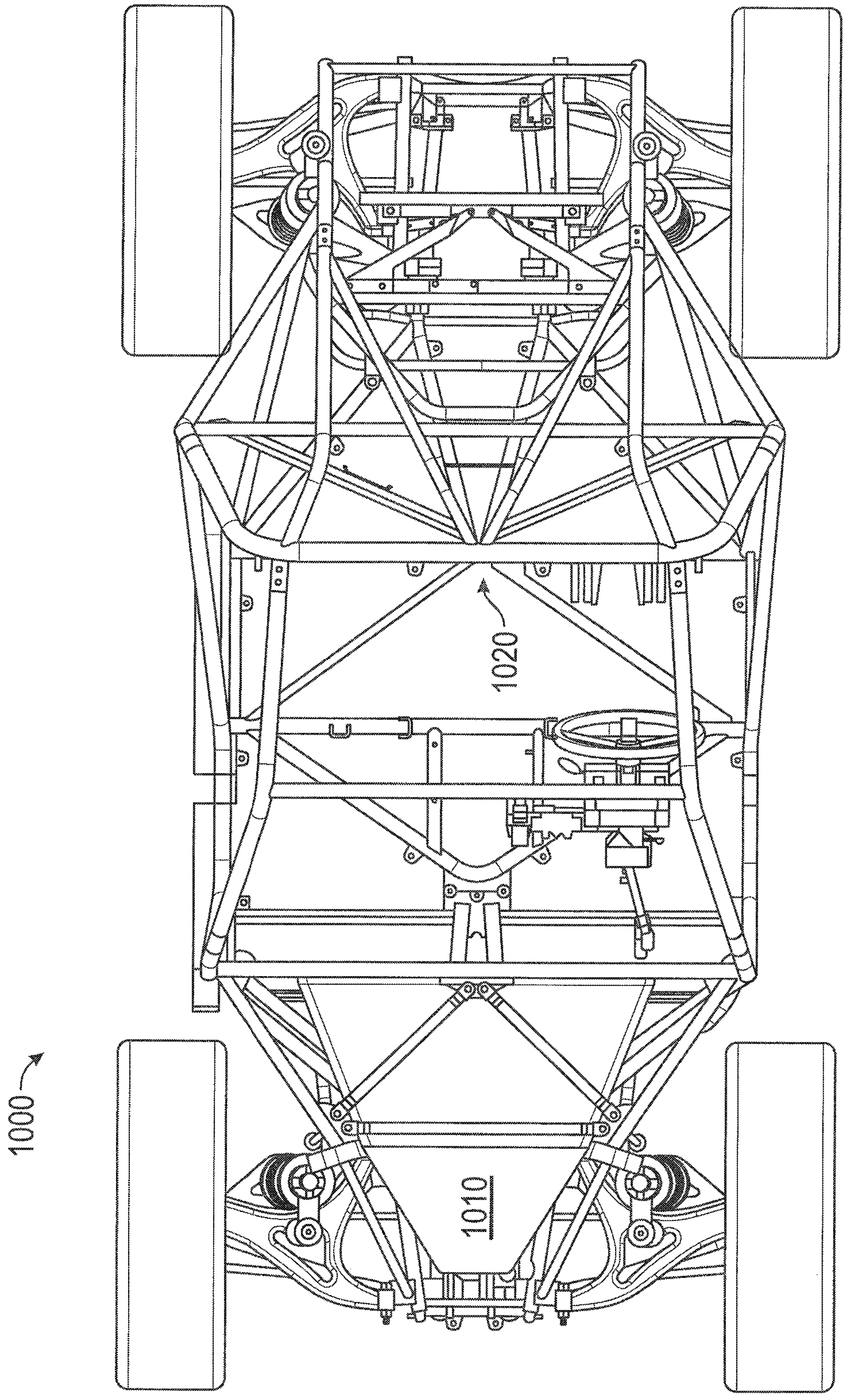
Figure 10E:
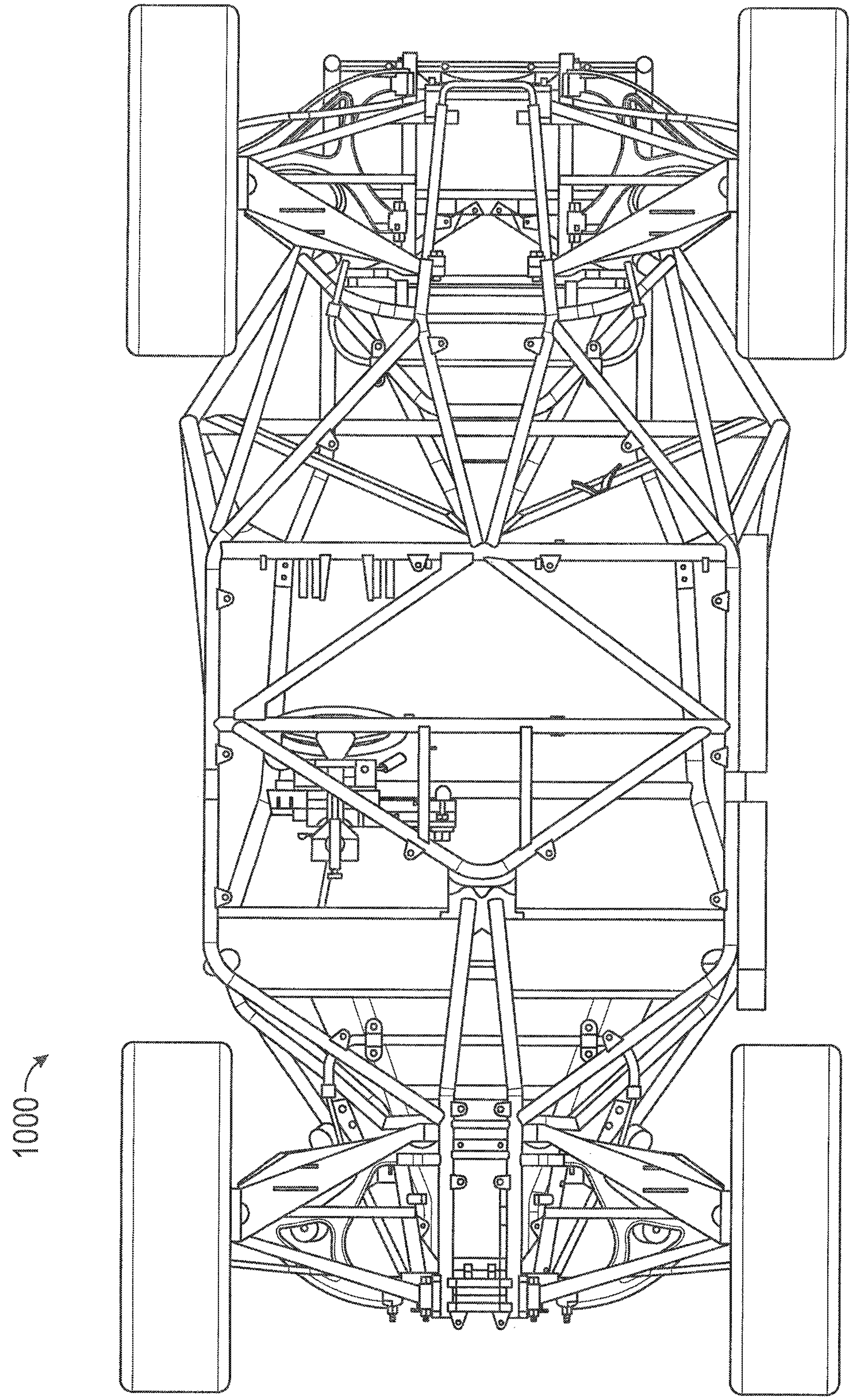
Figure 10F:
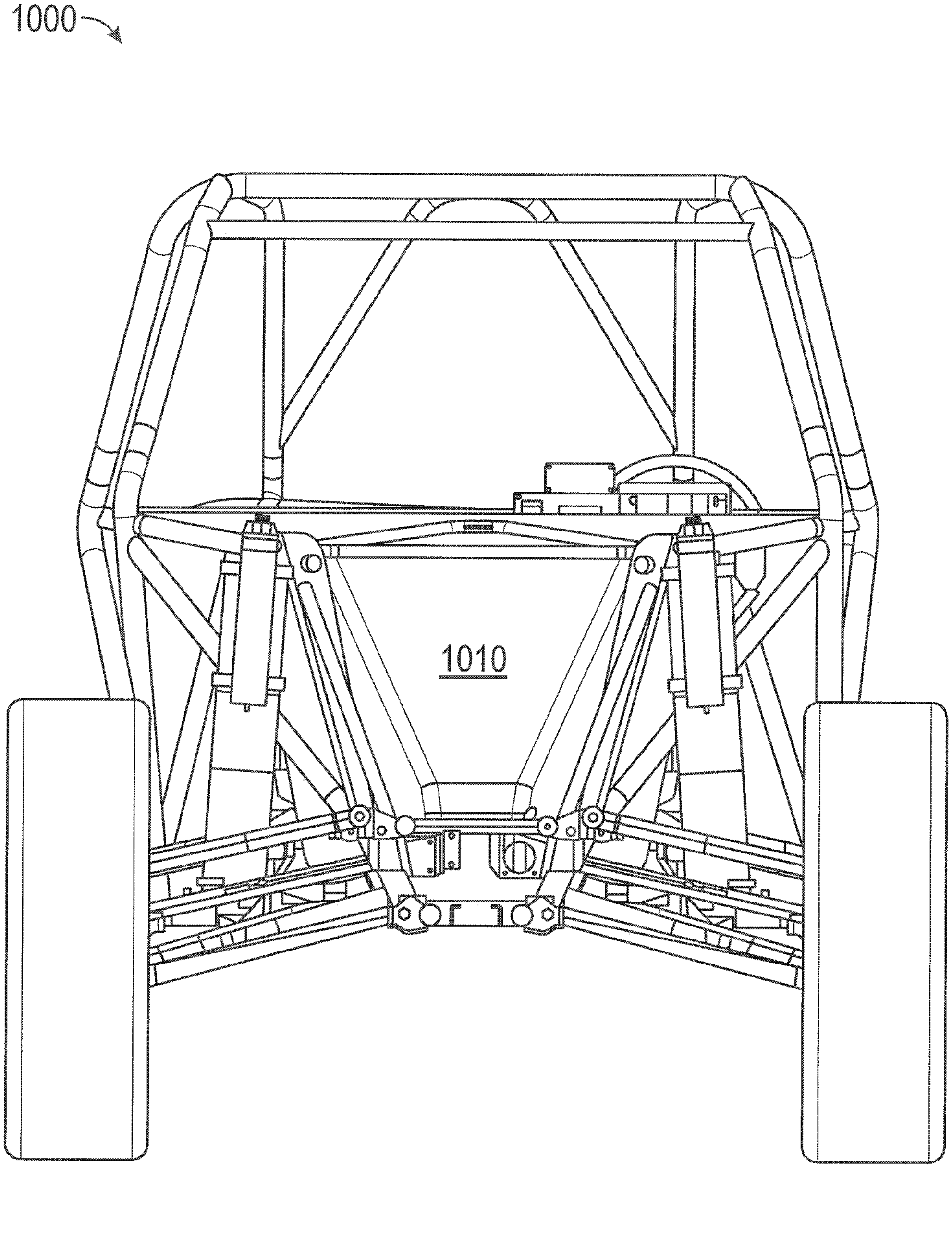

FIG. 9D shows a perspective rear view of a portion of an off-road vehicle. It should be understood that the batteries 912 are shown stacked horizontally by way of example. In other arrangements, the batteries are stacked vertically (e.g., on top of each other) in one or more stacks (e.g., two stacks).

As another example, FIGS. 10A through 10F show an example electric vehicle 1000 with an alternative battery box 1010 in accordance with certain embodiments. Similar to the battery box 110 (FIG. 3A through 3F), in some embodiments, the battery box 1010 includes separate compartments to store battery modules and other components (e.g., a motor controller, a BMS, a DC/DC converter, etc.).

However, unlike the battery box 110, in some embodiments, the battery box 1010 positions the battery compartment closest to a seating area 1020 of the electric vehicle 1000, and the component compartment farthest from the seating area 1020. Such an orientation provides certain advantages such as placing the batteries nearest to the passengers for possible heat sharing, placing non-battery components away from the seats for easier access, and so on.

It should be appreciated that, in accordance with certain embodiments, placing the battery modules in the rear of the battery box 1010 adjacent the seating area helps keep weight towards the middle of the electric vehicle 1000. Further in accordance with certain embodiments, placing the other components in the front of the battery box 1010 away from the seating area allows for easy accessibility when connecting/disconnecting outside components to the battery box 1010.

Certain portions of the electric vehicle 1000 (e.g., exterior panels, doors, a hood, a cargo bed, etc.) may have been omitted from these figures for simplicity and/or to better show other details of the electric vehicle 1000.

Certain Details (e.g., Powertrain Features)

Some embodiments are directed to an off-road vehicle which includes a frame and a differential coupled with the frame. The differential is constructed and arranged to operate a rear axle (or a rear differential that operates the rear axle). The off-road vehicle further includes a battery box being disposed over the frame between the differential and the rear axle area. The battery box includes a container, and a set of batteries disposed within the container. The set of batteries is constructed and arranged to provide electric power to an electric motor that provides drive to the differential.

In some arrangements, the frame defines a seating area to seat passengers in a side-by-side arrangement above the differential.

Certain Details (e.g., Component Configuration)

In accordance with certain embodiments, a housing for a SxS vehicle's battery compartment is positionable towards the center of the vehicle so that it locates near the desired center of gravity. In some embodiments, the housing includes a second compartment rearward of the battery compartment constructed and arranged to house other components such as a battery management system (BMS), an electric motor controller, and a DC/DC converter. In some embodiments, the BMS is arranged on a reinforced bulkhead separating the two compartments, which puts it in a position adjacent the battery stacks to shorten the wiring therebetween while still maintaining electrical/heat isolation. In some embodiments, the DC/DC converter and the motor controller are positioned on outer walls so that fluid heat exchangers may be utilized to cool these components, and the fluid ports can be located at the periphery where it is easy to access and install. Similarly, in some embodiments, an electrical interface is positioned on an outer wall of the second compartment to provide easy access during installation and maintenance.

In some embodiments, compartment 1 houses one or more stacks of battery cells positioned at the forward end of the box so that they are positioned closed to the electric motor and the engine compartment. In some embodiments, this configuration includes 4 battery modules per stack. Positioning the stacks near the motor and engine compartment is advantageous by positioning more of the weight closer to vehicle center (between axles).

In some embodiments, compartment 2 houses a BMS, a motor controller, a DC/DC converter, solenoids, and chargers. In some embodiments, these components have the ability to generate heat, so arranging them in a separate compartment rearward of the batteries allows for the heat to be managed.

In some embodiments, the BMS is mounted on the internal wall (bulkhead) positioned adjacent to the battery compartment to streamline the connections therebetween. In some embodiments, the internal wall and the exterior walls are reinforced with a metal skeleton that provides additional structural support to these components.

In some embodiments, the DC/DC converter and the motor controller are typically air cooled but are provided with a heat exchanger (with cooling fluid channels) positioned between the components and the wall to transfer heat from the second compartment.

Certain Details (e.g., Positioning)

Some embodiments are directed to an off-road vehicle which includes a frame that defines a seating area to seat passengers in a side-by-side arrangement and a rear axle area to support a rear axle. The off-road vehicle further includes a cargo carrying assembly coupled with the frame, the cargo carrying assembly being constructed and arranged to carry cargo. The off-road vehicle further includes a battery box being disposed over the frame between the seating area and the rear axle area, and underneath at least a portion of the cargo carrying assembly. The battery box includes a container, and a set of batteries disposed within the container. The set of batteries is constructed and arranged to provide electric power for the off-road vehicle.

In some arrangements, the off-road vehicle further includes a cradle assembly constructed and arranged to attach to the frame to form a battery box cradle that supports at least a portion of the battery box once the battery box is installed onto the off-road vehicle.

In some arrangements, the off-road vehicle further includes a metallic plate section constructed and arranged to attach to the frame over the battery box, the metallic plate section being constructed and arranged to constrain deflection of a top portion of the battery box during deflection events encountered by the off-road vehicle.

In some arrangements, the battery box further includes componentry that supports operation of the set of batteries. Additionally, the set of batteries are disposed within the container in a set of battery locations. Furthermore, the componentry is disposed within the container in a componentry location. Also, the set of battery locations is closer to the seating area than the componentry location.

Certain Details (e.g., Electrical Features)

Some embodiments are directed to a battery box which includes a container, a set of batteries disposed within the container, and an interlock that places the set of batteries in a high voltage configuration when the interlock couples with the container and a low voltage configuration when the interlock is removed from the container.

In some arrangements, the container includes a first section and a second section. Additionally, the interlock prevents the first section and the second section from being separated from each while the interlock couples with the container, and allows the first section and the second section to be separated from each while the interlock is removed from the container.

Other embodiments are directed to an off-road electric vehicle which includes a frame that defines a seating area to seat passengers in a side-by-side arrangement. The off-road electric vehicle further includes an electric propulsion system supported by the frame, the electric propulsion system being constructed and arranged to provide vehicle propulsion using electric power. The off-road electric vehicle further includes a battery box supported by the frame. The battery box includes:

(A) a container, (B) a set of batteries disposed within the container, the set of batteries being constructed and arranged to provide the electric power, and (C) an interlock that places the set of batteries in a high voltage configuration when the interlock couples with the container and a low voltage configuration when the interlock is removed from the container.

Certain Details (e.g., Thermal Management)

Some embodiments are directed to a battery box container which includes a bottom, a set of exterior walls extending from the bottom, and a lid constructed and arranged to engage with the set of exterior walls to enclose an inner space within which heat from componentry residing within the inner space is contained.

In some arrangements, the set of exterior walls defines an inlet port that provides fluid access into the inner space, and an outlet port that provides fluid access from the inner space.

In some arrangements, the battery box container further includes a motor controller mounting plate disposed within the inner space. The motor controller mounting plate is constructed and arranged to support a motor controller and thermally couple with the motor controller to manage heat generated by the motor controller.

In some arrangements, the battery box container further includes a DC/DC converter plate disposed within the inner space, the DC/DC converter mounting plate being constructed and arranged to support a DC/DC converter and thermally couple with the DC/DC converter to manage heat generated by the DC/DC converter.

In some arrangements, the battery box container further includes a set of conduits interconnecting the motor controller mounting plate and the DC/DC converter plate with the inlet port and the outlet port.

In accordance with certain embodiments, a SxS vehicle is provisioned with a first compartment for batteries and a second compartment for components such as a BMS, an electric motor controller, and a DC/DC converter. In some embodiments, these items (e.g., the BMS, the DC/DC converter, and/or the motor controller) produce heat that can be applied to the batteries or other parts of the vehicle depending on operating conditions. Typically, the DC/DC converter and the electric motor controller are air cooled components. However, certain embodiments include placing them in a protective and sealed housing and utilizing a different heat transfer system. Along these lines, in certain embodiments, a heat exchanger (e.g., a fluid system) is used to cool the DC/DC converter and the electric motor controller. In some embodiments, the heat transferred from these items is selectively used to heat the battery stacks and/or the passenger compartment as needed. In some embodiments, if no heat is needed, the heat is transferred to the environment. In some embodiments, the heat exchanger (with cooling fluid channels) is positioned between components and the wall to provide an ability to transfer heat from the second compartment.

In some embodiments, a physical barrier between the first compartment containing batteries and the second compartment helps prevent transfer of heat when heat is not desired. In some embodiments, a box bellow allows for controlled expansion and contraction of the gas housed within the box due to heat or other by allowing the bellow to expand or collapse based on the boxes needs (when heat is not desired). In some embodiments, the larger heat producing items in compartment 2 (with BMS/DC/DC converter/electric motor controller) are water cooled and the coolant passes through the box through plumbing (bulkhead fittings) to a heat exchanger. In some embodiments, that heat exchanger is designed to have the heat directed: 1) to the atmosphere 2) to the battery compartment (provide heat in cold weather) 3) occupant compartment or 4) some combination of those options. In some embodiments, the heat is transferred via fluid lines to a heat exchanger positioned in the battery compartment, or via air heated by a heat exchanger and routed to the battery compartment and/or the passenger compartment. It should be appreciated that positioning the batteries adjacent the passenger compartment simplifies the ducting for heating the passenger compartment.

Certain Details (e.g., Mechanical Features)

Some embodiments are directed to a battery box container which includes a metallic skeleton, and an insulative inner layer coupled with the metallic skeleton. The insulative inner layer faces an inner space defined by the metallic skeleton. The battery box container further includes an insulative outer layer coupled with the metallic skeleton, the insulative outer layer facing outwardly from the metallic skeleton.

In some arrangements, the battery box container further includes a set of inner walls disposed with the inner space and coupling with the insulative inner layer. The set of inner walls separate the inner space into multiple cavities.

In some arrangements, the metallic skeleton and insulative layers form a bottom and a set of exterior vertical walls that extend from the bottom. Additionally, the set of inner walls extend vertically from the bottom to divide the inner space into the multiple cavities.

In some arrangements, the battery box container further includes a lid constructed and arranged to engage with the set of exterior walls. The lid, the bottom and the set of exterior walls enclose the inner space when the lid engages with the set of exterior walls.

In some arrangements, the set of inner walls separates the inner space into (i) a set of battery cavities for holding respective sets of batteries and (ii) a component cavity for holding components that support operation of the set of batteries.

In some arrangements, the set of inner walls inhibit air flow between each of battery cavity and the component cavity. Additionally, the set of inner walls allows air flow between the sets of battery cavities.

In some arrangements, the battery box container further includes a diaphragm constructed and arranged to accommodate pressure changes among the multiple cavities. In some embodiments, the battery box container includes a burst plate (or blow-off valve), e.g., to allow sudden large changes of pressures to escape as opposed to destroying the box. In some embodiments, the burst plate includes springs constructed and arranged to keep the battery box sealed when a pressure within the battery box is below a certain threshold. In some embodiments, the springs are constructed and arranged to allow the burst plate to move away from the box in a controlled manner, e.g., to allow for a rapid and sudden increase in pressure.

ADDITIONAL DETAILS

It should be appreciated that on a conventional side-by-side (SxS) vehicle, individual components are commonly spread across a chassis of the vehicle. For such a vehicle, each component is rated for harsh environments.

Along these lines, SxS vehicles are used in harsh conditions where moisture can be a concern. An electric powertrain can become very complicated and expensive if each individual item must be rated for such conditions. Mounting of the individual components across the chassis and connecting them in a way that maintains the ratings can also be difficult. Certain embodiments disclosed herein alleviate those concerns by providing a protective housing that allows lower rated components to be operated in harsh environments.

In accordance with certain embodiments, a metal reinforced polymer box houses battery stacks and other components such as the battery management system, electric motor controller, and the DC/DC converter. The electric motor is positioned underneath the passenger seat and the box is positioned rearward of the motor/passenger compartment slightly forward of the rear differential/axle. The box is also positioned underneath the cargo bed, which allows for easy installation of the box/components.

In some embodiments, an electric side-by-side vehicle is built on a frame that may also be used for traditional internal combustion engine and hybrid electric vehicle models. In some embodiments, the battery box houses the batteries, battery management system, and motor controller in a way that protects these components while still accommodating positioning of the drivetrain components, such as the driveshaft, that are common on each model, thereby reducing cost.

In some embodiments, the box extends across the width of the vehicle underneath the seat at the forward end and under the cargo bed at the rearward end. In some embodiments, the batteries are housed on outboard sides of the box, and the portion of the box in the middle of the vehicle that is positioned between the batteries is raised to form a tunnel or hat section therebetween. In some embodiments, this raised portion is where the BMS and the motor controller are located. In some embodiments, the driveshaft extends through the tunnel and underneath the BMS and motor controller. Therefore, the same driveshaft is able to be used in a configuration that is common across the different models.

In accordance with certain embodiments, the battery box housing protects the batteries, BMS, and motor controller in a way that can accommodate conventional drivetrain components.

A contemporary configuration of a four-wheel drive vehicle consists of an internal combustion engine attached to a transaxle, that is located at the rear of the vehicle, through a continuously variable transmission (CVT) which powers the rear wheels directly through a set of gears, while also driving the front wheels via a driveshaft that exits the transaxle towards the front of the side-by-side vehicle and into a differential that splits the power out to the wheels. In some cases, this layout can be flipped with the engine in the front of the vehicle (e.g., with everything reversed). In either scenario, it is possible to switch the vehicle into two-wheel drive by decoupling the differential.

Another contemporary configuration of a four-wheel drive vehicle consists of two transaxles, one per set of wheels (front and rear), with their own respective motors attached and the ability to power each set of wheels either collectively or independently.

In contrast with contemporary configurations of a four-wheel drive vehicle, certain embodiments disclosed herein are directed to an improved powertrain layout centrally locates a powerplant (e.g., a gas engine, electric motor, or hybrid mixture of both) that is used to drive either a transaxle or differential. Exiting from this centrally located transaxle/differential is a configuration of drive shafts fore and aft of the vehicle so that power can be transmitted into a rear and/or front differential, thus splitting up the power and sending it out to their respective wheel sets.

There are a number of benefits from this unique configuration. In some embodiments, in this configuration, there is an ability to either engage both front and rear or any number of wheel sets simultaneously. For example, some embodiments engage both front and rear wheel sets for four-wheel drive (e.g., where only four wheels exist). Additionally, some embodiments engage only the rear and/or front wheel seats via differentials that are selectively engaged or disengaged (e.g., electrically or mechanically) for rear-wheel drive or front-wheel drive. The advantages of these options allow for additional maneuverability.

For example, certain embodiments have an ability to apply rear braking while dragging the vehicle with the front wheel sets only. This currently does not exist in a contemporary gas configuration. Rather, the contemporary gas configuration only decouples and recouples an axle opposite of another axle having the engine attached.

Further, some embodiments have an ability to disconnect the centrally located differential/transaxle and/or the front and rear differentials simultaneously, e.g., to allow for an idle scenario for an electrically powered vehicle. Advantageously, this affords the option of running a power take-off (PTO) for driving hydraulic pumps, for example.

Some embodiments allow for the mass production of a two-wheel drive vehicle while also allowing for an option of allowing for a four-wheel drive option. Regardless of the application, this four-wheel drive configuration eliminates the loss of half of available horsepower during an axle-slipping event in an electric powertrain application. Along these lines, in contemporary four-wheel drive motor powered golf car, a respective motor and a respective transaxle are located at each set of wheels. For example, a contemporary 5-horsepower motor in the front and another contemporary 5-horsepower in the rear would have 10 total horsepower available at the ground. The moment slipping occurs at any one of the respective transaxles, the contemporary golf car loses that axle's ability to transmit power to the ground. This would lower available power to 5-horsepower. In contrast with the contemporary golf car, certain embodiments are directed to a centrally located configuration. This configuration enables all horsepower to still be available to a remaining axle if one of the axles began slipping.

Some embodiments are provisioned with the following:

1. Battery box positioning improvement(s)
    - The box sits behind the seats of the side-by-side and slightly ahead of the rear axle.
    - The box sits under the vehicle bed.
    - The box places the battery modules nearest to the seats, and the componentry farthest from the seats.
    - A subframe (cradle assembly) is added to existing combustion vehicle frame prior to box installation.
    - A metallic plate resides at top of battery box.
    - Certain advantages
        - The battery box may be installed with pre-connected battery modules and components as a unit.
        - The subframe is added to the existing combustion vehicle frame to support the box without further frame modifications.
    - The subframe serves as a retrofit to enable use of battery box.
        - The box may be lowered onto and bolted to subframe to simplify vehicle assembly.
        - The metallic plate constrains the lid/the top portion of the box preventing contact with the vehicle frame during high deflection events (e.g., acceleration, rough terrain, etc.).
        - The metal plate helps with side loading.
        - The battery box accommodates 2 module stacks/4 modules per stack (using off the shelf modules in their own packaging)
        - The weight from the battery modules is closer to vehicle center (between axles).
        - The proximity of batteries to the seats may provide a temperature benefit (e.g., heating for a cab/seats/etc.).
        - The location of componentry farthest from seats allows for a connection panel with good accessibility.
2. Battery box mechanical improvement(s)
    - The battery box has an internal metal skeleton with welded nuts.
    - The battery box has insulative material around the exterior.
    - The battery box has insulative material around the interior.
    - Materials may include plastic, nylon, ABS, fiber for reinforcement, etc.
    - The battery box is formed by casting epoxy around the metal skeleton.
    - This can be an injection molded structure with metal inserts.
    - Interior walls (or bulkheads) separate the internal space into 2 module spaces and 1 component space
    - The interior wall between the 2 module spaces permits air may flow above the interior wall.
    - The interior wall to the component space does not permit airflow.
    - The interior wall to the component space is metal reinforced.
    - The lid has a convex shape in center to accommodate the BMS.
    - The bottom of the base mimics the top surface of a battery module to improve floor mounting.
    - The battery box may be provisioned with a bellows or a diaphragm.
    - Certain advantages
        - The metal skeleton provides sufficient strength so no additional support (e.g., support members, beams, etc.) is needed to support the batteries.
        - The metal skeleton enables extension of chassis ground to battery box components.
        - The exterior insulation protects against the environment (e.g., water, dust, etc.).
    - The interior wall interior wall between the 2 module spaces provides electrical isolation between the 2 module spaces.
        - Air flow above the interior wall interior wall between the 2 module spaces enables temperature balancing between to the 2 module spaces.
    - The interior wall to the component space provides heat and electrical isolation.
    - The bellows/diaphragm provides pressure compliance/adjustment between the interior and exterior of the battery box.
    - If features are molded into the box, there is no need for subsequent installation of brackets.
    - If there are brackets, it may be easier to upgrade with new equipment or something else so brackets may not be a bad idea.
3. Battery box electrical and fluid connection improvement(s)
    - A top plate interlock resides at the top of the battery box.
    - An electrical loop extends around the top edge of the battery box to detect lid presence.
    - A connection panel is disposed on a side of the battery box.
    - A manual service disconnect (MSD) plugs into the connection panel.
    - Some connectors have interlocks to sense when connections (e.g., to cables) are present.
    - The electrical componentry within the battery box includes: BMS, motor controller, DC/DC converter, contactors, bus bars, cabling, etc.
    - Certain advantages
        - The electrical componentry receives protection and environmental control from the box.
    - While the battery box is fully assembled, the battery modules connect to provide high voltage output.
        - The top plate interlock and the MSD safeguard against injury by reducing the battery configuration from the high voltage configuration to a low voltage configuration when removed.
            - Cannot open lid without breaking interlock circuit.
            - Cannot take lid off and get high voltage.
    - Current has to flow through MSD for high voltage so safer when removed.

Interlock sensing and sensors within the components enable smarter operation.

The connection panel provides CAN bus access (e.g., for control/status/etc.), charging access, 12V access, and 3-phase power to the electric motor.

4. Battery box heat management improvement(s)

The motor controller and the DC/DC converter mount to metal liquid-cooled plates.

There is one fluid inlet to the component space of the battery box.

There is one fluid outlet to the component space of the battery box.

The metal liquid-cooled plates for the motor controller and the DC/DC converter are coupled together.

Certain advantages

Heat is contained within the component space of the battery box.

Heat removed by circulating liquid may be reused for other purposes.

Heat could be exhausted into front cab.

The battery box may be easily enhanced to receive heat (or cooling) into the 2 module spaces to control battery module temperature.

5. Center differential improvement(s)

The center differential is located in front of the battery box and under seats of the side-by-side.

The center differential may operate both front and back differentials.

Certain advantages

Accommodates battery box location behind the seats

Enables more efficient consumption of space up to the rear axle

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A battery box assembly, comprising:

a metallic skeleton;

an insulative inner layer coupled with the metallic skeleton, the insulative inner layer facing an inner space defined by the metallic skeleton; and an insulative outer layer coupled with the metallic skeleton, the insulative outer layer facing outwardly from the metallic skeleton;

wherein the insulative outer layer defines a bottom and a set of exterior walls that extend from the bottom; and wherein the battery box assembly further comprises:

a lid constructed and arranged to couple with the set of exterior walls, wherein the lid, the bottom, and the set of exterior walls enclose the inner space when the lid is coupled with the set of exterior walls; and a metallic plate constructed and arranged to couple with the lid and further couple with a set of upper frame members of an off-road vehicle to prevent the insulative outer layer from colliding with the set of upper frame members during a deflection event.

2. The battery box assembly of claim 1, further comprising:

a set of inner walls disposed within the inner space and coupled with the insulative inner layer, the set of inner walls separating the inner space into multiple cavities.

3. The battery box assembly of claim 2 wherein the set of inner walls separates the inner space into (i) a set of battery cavities constructed and arranged to house respective sets of battery modules and (ii) a component cavity constructed and arranged to house a set of electrical components configured to transfer power to and from the sets of battery modules.

4. The battery box assembly of claim 3 wherein the set of battery cavities includes at least two battery cavities; and wherein the set of inner walls includes a first inner wall and a second inner wall, the first inner wall separating the at least two battery cavities from each other, the second inner wall separating the component cavity from the set of battery cavities, the second inner wall extending further from the bottom than the first inner wall to inhibit airflow between the component cavity and the set of battery cavities.

5. The battery box assembly of claim 3, further comprising:

a set of metallic fasteners constructed and arranged to couple with the metallic plate and the metallic skeleton; and wherein the metallic plate and the set of metallic fasteners are constructed and arranged to connect the metallic skeleton to a chassis ground of the off-road vehicle.

6. The battery box assembly of claim 3, further comprising:

an interlock assembly constructed and arranged to couple with the metallic plate and maintain the sets of battery modules in a low voltage configuration when the lid is decoupled from the set of exterior walls, wherein the set of battery modules in the low voltage configuration is configured to transmit lower voltage compared to the set of battery modules in a high voltage configuration.

7. The battery box assembly of claim 3, wherein the lid, the bottom, and the exterior walls are constructed and arranged to form a watertight enclosure for the inner space when the lid is coupled with the set of exterior walls; and wherein the battery box assembly further comprises:

a pressure release assembly constructed and arranged to reduce pressure within the inner space while the lid is coupled with the set of exterior walls.

8. The battery box assembly of claim 3, further comprising:

a set of mounting members disposed within the compartment cavity, the set of mounting members being constructed and arranged to mount the set of electrical components, the set of electrical components including at least a motor controller, a battery management system (BMS), and a DC/DC converter.

9. The battery box assembly of claim 3, wherein the insulative inner layer defines a floor that mimics at least one top portion of a battery module, the floor being constructed and arranged to interface with at least one bottom portion of the sets of battery modules to vertically stack the sets of battery modules.

10. The battery box assembly of claim 3, further comprising:

a heat exchanger constructed and arranged to transfer heat from the component cavity to the set of battery cavities to warm the respective sets of battery modules.

11. The battery box assembly of claim 3, further comprising:

an electrical connections port coupled with the insulative outer layer, the electric connection port being constructed and arranged to provide access to the set of electrical components.

12. The battery box assembly of claim 1 wherein the insulative outer layer includes a polymeric coating constructed and arranged to electrically and thermally insulate the inner space.

13. The battery box assembly of claim 1, wherein the lid is disposed between the metallic plate and an upper end of the set of exterior walls; and wherein the battery box assembly further comprises:

a set of fasteners that extends from the metallic plate, through the lid, and into the set of exterior walls to couple the metallic plate, the lid, and the set of exterior walls with each other.

14. The battery box assembly of claim 13, wherein the set of fasteners includes one or more metallic fasteners that contact both the metallic skeleton and the metallic plate; and wherein the battery box assembly further comprises:

another set of fasteners that couples the metallic plate to the set of upper frame members of the off-road vehicle to electrically connect the metallic skeleton with a chassis ground of the off-road vehicle via the metallic plate and the one or more metallic fasteners.

15. An off-road vehicle, comprising:

a frame;

an electric motor coupled with one or more ground engaging members; and a battery box assembly disposed over the frame and constructed and arranged to provide power to the electric motor, the battery box assembly including:

a metallic skeleton;

an insulative inner layer coupled with the metallic skeleton, the insulative inner layer facing an inner space defined by the metallic skeleton; and an insulative outer layer coupled with the metallic skeleton, the insulative outer layer facing outwardly from the metallic skeleton;

wherein the insulative outer layer defines a bottom and a set of exterior walls that extend from the bottom; and wherein the battery box assembly further comprises:

a lid constructed and arranged to couple with the set of exterior walls, wherein the lid, the bottom, and the set of exterior walls enclose the inner space when the lid is coupled with the set of exterior walls; and a metallic plate constructed and arranged to couple with the lid and further couple with a set of upper frame members of the off-road vehicle to prevent the insulative outer layer from colliding with the set of upper frame members during a deflection event.

16. The off-road vehicle of claim 15 wherein the battery box assembly further includes:

a set of inner walls disposed within the inner space and coupling with the insulative inner layer, the set of inner walls separating the inner space into (i) a set of battery cavities constructed and arranged to house respective sets of battery modules and (ii) a component cavity constructed and arranged to a set of electrical components configured to transfer power to and from the set of battery modules; and wherein the set of battery cavities are disposed closer to a center of the off-road vehicle than the component cavity to provide the sets of battery modules closer to the center of the off-road vehicle.

17. A method of providing a battery box assembly, the method comprising:

providing a metallic skeleton;

coupling an insulative inner layer with the metallic skeleton, the insulative inner layer facing an inner space defined by the metallic skeleton; and coupling an insulative outer layer with the metallic skeleton, the insulative outer layer facing outwardly from the metallic skeleton;

wherein the insulative outer layer defines a bottom and a set of exterior walls that extend from the bottom; and wherein the battery box assembly further comprises:

a lid constructed and arranged to couple with the set of exterior walls, wherein the lid, the bottom, and the set of exterior walls enclose the inner space when the lid is coupled with the set of exterior walls; and a metallic plate constructed and arranged to couple with the lid and further couple with a set of upper frame members of an off-road vehicle to prevent the insulative outer layer from colliding with the set of upper frame members during a deflection event.

18. The method of claim 17, wherein the battery box assembly includes a set of inner walls disposed within the inner space and coupling with the insulative inner layer, the set of inner walls separating the inner space into (i) a set of battery cavities and (ii) a component cavity; and wherein the method further includes:

installing respective sets of battery modules within the set of battery cavities; and installing a set of electrical components within the component cavity, the set of electrical components being configured to transfer power to and from the sets of battery modules.

19. The method of claim 18, further comprising:

after installing the respective sets of battery modules and installing the set of electrical components, inserting the battery box assembly into the off-road vehicle to provide the off-road vehicle with the sets of battery modules and the set of electrical components simultaneously.

* * * * *